(12) United States Patent
Horsnell et al.

(10) Patent No.: US 7,410,245 B2
(45) Date of Patent: *Aug. 12, 2008

(54) SOLENOID VALVE

(75) Inventors: David Andrew Horsnell, Cambridge (GB); Matthew Brian Tomlin, Cambridge (GB); Ammar Lecheheb, Cambridge (GB); Oliver John Prime, Cambridge (GB); Michael John Fox, Rutland (GB); Christopher Michael Bates, Kettering (GB)

(73) Assignee: Willett International Limited, Corby (GB)

( * ) Notice: Subject to any disclaimer, the term of this patent is extended or adjusted under 35 U.S.C. 154(b) by 21 days.

This patent is subject to a terminal disclaimer.

(21) Appl. No.: 11/452,515

(22) Filed: Jun. 14, 2006

(65) Prior Publication Data

US 2006/0244783 A1    Nov. 2, 2006

Related U.S. Application Data

(62) Division of application No. 10/492,258, filed as application No. PCT/CA02/01544 on Oct. 15, 2002, now Pat. No. 7,331,654.

(30) Foreign Application Priority Data

| Oct. 13, 2001 | (GB) | ................................ 0124663.6 |
| Jul. 11, 2002 | (GB) | ................................ 0216025.7 |
| Jul. 11, 2002 | (GB) | ................................ 0216029.9 |
| Jul. 22, 2002 | (GB) | ................................ 0216935.7 |

(51) Int. Cl.
*B41J 2/04* (2006.01)
*B05B 1/30* (2006.01)

(52) U.S. Cl. .............................. 347/54; 347/47; 347/85; 239/585.1; 239/585.5; 251/129.15; 8/445

(58) Field of Classification Search ..................... 8/445; 347/54, 47, 85; 239/585.1, 585.5; 251/129.15
See application file for complete search history.

(56) References Cited

U.S. PATENT DOCUMENTS

| 3,969,779 A | * | 7/1976 | Stewart, Jr. ..................... 8/149 |
| 4,742,964 A | | 5/1988 | Ito |
| 4,869,429 A | | 9/1989 | Brooks |
| 4,949,904 A | | 8/1990 | Bata |

(Continued)

FOREIGN PATENT DOCUMENTS

| EP | 0109242 | * | 6/1984 |
| WO | 94/08794 | * | 4/1994 |
| WO | WO 94/08794 | | 4/1994 |
| WO | WO 98/56585 | | 12/1998 |

*Primary Examiner*—Lorna M. Douyon
*Assistant Examiner*—Amina Khan
(74) *Attorney, Agent, or Firm*—McAndrews, Held & Malloy, Ltd.

(57) ABSTRACT

The invention relates to a solenoid valve made using certain materials which is capable of operation at high frequencies and which can be made as a compact unit. The plunger (1) is made from an electromagnetic material having a saturation flux density greater than 1.2 Tesla preferably more than 1.6 Tesla, the bore leading from the valve head chamber (14) to the nozzle orifice (12) has a length to diameter ratio of less than 5:1 preferably between 2:1 and 4:1 and the nozzle orifice (12) has a diameter of 80 micrometer or less. The invention also relates to method for operating a drop on demand ink jet printer incorporating such a valve.

2 Claims, 10 Drawing Sheets

U.S. PATENT DOCUMENTS

| | | |
|---|---|---|
| 4,985,715 A | 1/1991 | Cyphert et al. |
| 5,641,148 A | 6/1997 | Pena |
| 5,829,122 A | 11/1998 | Keuerleber |
| 5,887,798 A | 3/1999 | Ohta |
| 5,958,547 A * | 9/1999 | Fukunishi et al. .......... 428/32.1 |
| 6,279,843 B1 | 8/2001 | Coldren |
| 6,286,770 B1 | 9/2001 | Boaro |
| 6,315,914 B1 * | 11/2001 | Silverbrook ................. 216/27 |
| 6,409,102 B1 | 6/2002 | Luttrell |
| 6,422,533 B1 | 7/2002 | Harms |
| 6,431,693 B2 | 8/2002 | Eida |
| 6,439,705 B2 | 8/2002 | Eida |
| 6,471,896 B1 * | 10/2002 | Katsuki et al. ................ 264/78 |
| 6,942,469 B2 | 9/2005 | Seale |
| 2005/0231553 A1 * | 10/2005 | Horsnell et al. ............... 347/47 |
| 2006/0098060 A1 * | 5/2006 | Horsnell et al. ............... 347/85 |
| 2006/0238587 A1 * | 10/2006 | Horsnell et al. ............. 347/100 |

* cited by examiner

SOLENOID VALVE

RELATED APPLICATIONS

The present application is a division of U.S. application Ser. No. 10/492,258, filed Dec. 28, 2004, now U.S. Pat. No. 7,331,654 which is the United States national stage application of PCT/CA/01544, filed Oct. 15, 2002, which claims priority to British application 0216935.7, filed Jul. 22, 2002, all of which are hereby incorporated by reference in its entirety.

The present invention relates to a device, notably a high speed solenoid type valve, an ink jet printer incorporating that valve and methods of operating an ink jet printer, preferably utilising that valve.

BACKGROUND OF THE INVENTION

Ink jet printers are non-contact printers in which droplets of ink are ejected from one or more nozzle orifices so as progressively to build up a printed image on a substrate moved relative to the nozzle. One form of ink jet printer comprises a source of ink, typically a reservoir or bottle of ink, which is pressurised to from 0.1 to 2 bar, notably about 1 bar. The pressure is created, for example, by pressurising the air space above the ink in the bottle or reservoir. The ink is fed to the nozzle orifice(s) in a print head through which it is ejected as a series of droplets onto the surface of the substrate. The flow of ink through each nozzle orifice is controlled by a solenoid valve. Typically, such a valve comprises an electromagnetic plunger journalled for axial movement within an axially extending electric coil. The distal end of the plunger is located within a valve head chamber through which ink flows from the reservoir to the nozzle orifice. When current is fed through the coil, this generates a magnetic field which acts on the plunger to move it axially and thus open, or shut, the inlet of a bore from the valve head chamber to the nozzle orifice. Typically, the magnetic field acts to retract the plunger against the bias of a coil spring to create a flow path between the valve head chamber and the nozzle orifice. When the electric current no longer flows in the coil, the magnetic field ceases and the plunger returns under the bias of the spring to close the flow path to the nozzle orifice. Typically, a plurality of nozzle orifices are formed as one or more rows in a plate, the nozzle plate, and each nozzle orifice is served by a separate solenoid valve, so that droplets of ink can be ejected independently from one or more of the nozzle orifices. Typically, the valves are fed with ink from the reservoir via a manifold which serves to split and even the ink flow between each of the valves. The row of nozzle orifices is typically aligned transversely to the direction of travel of the substrate so that simultaneous operation of the valves will cause a row of ink dots to be printed on the substrate.

The valves are operated so as to deposit dots upon the substrate at the desired locations on the substrate to build up the elements of a five, seven, eight or more dot raster image on the substrate. By suitable timing of the opening of the various valves in the print head an alphanumeric or other image can be formed on the substrate to print a date, product batch code, logo, bar code or other image on the substrate. If desired, several print heads can be combined in an array so as to print a wider image on the substrate and the line of nozzle orifices in the print head can be angled to the direction of movement of the substrate so as to lay down droplets which are more closely spaced than where the print head is aligned normal to the line of travel of the substrate.

For convenience, the term drop on demand printer will be used to denote in general such types of ink jet printer.

The size of the printed dot can readily be altered by varying the duration for which the valve is held open, and hence the amount of ink that it allows to flow through the nozzle orifice. The form of the image which is printed can readily be altered by varying the sequence of operation of the valves in the print head so that droplets are ejected from the appropriate nozzles in the appropriate sequence to form the desired image. Such alterations of the images and the dot sizes can readily be controlled by a computer or microprocessor operating under an appropriate program or operating system. Such drop on demand printers are widely available commercially and find widespread use in printing a wide range of both visible and non-visible machine-readable images on a wide range of substrates.

However, as the speed of travel of the substrate past the print head increases, a point is reached at which the valve cannot be operated at sufficient speed to eject droplets at sufficient frequency to form the desired image without creating some distortion. Typically, the limit for the speed of operation of solenoid valves in current use in an ink jet printer head is less that 800 to 1000 Hz. With increasing pressure on manufacturers to increase through put from a given production or packaging line, there is an increasing need to be able to print the dots onto the substrate at rates greater than this.

In an alternative form of ink jet printer known as an impulse jet printer, a piezoelectric crystal or other transducer is applied to or forms part of a wall of an ink jet chamber having an ink inlet and an ink outlet to a nozzle orifice. When a voltage is applied to the transducer, the transducer expands or flexes and causes a change in the volume of the ink jet chamber. This causes a droplet of ink to be ejected from the chamber and to exit through the nozzle orifice. The transducer can be caused to flex at very high rates by electronic control of the frequency of the electrical pulses applied to the transducer, so that such a print head can apply dots at frequencies up to 15 kHz or more. However, the volume of ink ejected through the nozzle orifice is dependent upon the extent of flexing of the transducer. This can be varied by varying the amplitude of the electric pulse applied to the transducer. However, each type of transducer operates consistently only within a narrow percentage, typically plus or minus 50%, of the optimum operating pulse amplitude, so that only a limited range of dot sizes can be achieved with a commercially available impulse jet printer. This limits the number of applications for which a given impulse jet head can be used for.

It has been proposed in International Patent Application No PCT/SE97/01007 to produce a solenoid type valve for a drop on demand ink jet printer which is claimed to be capable of operating at frequencies of up to 3 kHz. Such a valve incorporates light weight components so as to reduce the inertia of the plunger and thus enable it to accelerate and decelerate rapidly at each extreme of its travel within the coil. To achieve this, the plunger is formed from two components, one made from an electromagnetic material so that it can be caused to move by the magnetic field generated by the current passing through the coil, and a second lightweight plastic component for the distal end of the plunger. Such a construction is complex and expensive. Furthermore, we have found that a print head incorporating such a valve design does not print acceptable images. For example, at high frequencies of operation of the valve, the printed dots are uneven and there are many small satellite dots around each of the primary dots printed by the print head.

We have now devised a form of valve which can be operated at speeds of up to 8 kHz or more and yet can be used in a drop on demand printer to print uniformly sized droplets over a surprisingly wide range of dot sizes and operating frequencies. Furthermore, the valve of the invention can be more compact and with smaller components than a conventional design of solenoid valve for use in a drop on demand ink jet printer. This allows high definition printing to be achieved at high print rates without excessive heat being generated during operation of the valve. Such a valve enables drop on demand technology to be used in high speed applications for which an impulse jet print head had hitherto been considered the only technically viable form of print head.

SUMMARY OF THE INVENTION

Accordingly, the present invention provides a valve mechanism for controlling the flow of fluid therethrough, which mechanism comprises a plunger member journalled for axial reciprocation between a rest and an operative position within a tubular member supporting an electric coil under the influence of a magnetic field generated by that coil when an electric current passes through the coil, bias means to bias the plunger towards its rest position when no current is applied to the coil, the distal end of the plunger extending into a valve head chamber having a outlet bore to a nozzle orifice, the reciprocation of the plunger being adapted to open or close a fluid flow path from the valve head chamber through that bore to the nozzle orifice, characterised in that:

a. the plunger is made from an electromagnetic material having a saturation flux density greater than 1.2 Tesla; and b. the bore leading from the valve head chamber to the nozzle orifice has a length to diameter ratio of 5:1 or less; and c. the nozzle orifice has a diameter of 80 micrometres or less.

For convenience, the terms distal and proximal will be used herein to denote that portion of a component which is located downstream and upstream respectively with respect to the flow of ink or other fluid through the valve. The valve of the invention is of especial application in drop on demand ink jet printers which are to be operated at drop generation frequencies of 1 kHz and higher. For convenience, the invention will be described hereinafter in terms of a valve for such an application.

In existing designs of solenoid valve, it is not possible to operate the valve for prolonged periods at speeds in excess of 1 kHz. We believe that this is due to the fact that the hysteresis of the material from which the plunger is made to changes in the magnetic field applied to it causes the material to become magnetically saturated so that it no longer can respond to further changes in the magnetic field applied to it. The use of a material having a magnetic saturation flux density of greater than 1.2 Tesla, preferably from greater than 1.4 Tesla, notably 1.4 to 1.8 Tesla, enables the plunger to continue to respond to changes in the magnetic field applied to it even after prolonged periods of operation at frequencies in excess of 3 kHz and more, for example up to 9 kHz, without becoming magnetically saturated. Furthermore, where the coil/plunger combination also has a high magnetic inductance, for example 9 milliHenrys or more, the coil can exert a high driving force on the plunger further enhancing the rate of response of the plunger to changes in the electrical current flowing through the coil. These properties enable a smaller plunger, that is one of smaller mass, to be used, since a given drive current can exert a greater force on the plunger of a given size than where a conventional material of construction is used. These properties result in a plunger which can be accelerated rapidly at either extreme of its travel with a comparatively low driving current, thus reducing the heat generated during operation of the valve.

We have also found that it is desirable to reduce the gap between the coil and the plunger to a minimum so as to reduce the loss of magnetic coupling between the coil and the plunger to a minimum. This enhances the response of the plunger to changes in the current applied to the coil and reduces the amplitude of the current required to drive the plunger within the coil. In conventional designs of solenoid valve proposed hitherto, the coil is wound upon a plastic or other bobbin and the bobbin then mounted upon a tube forming the bore within which the plunger reciprocates. This results in the formation of a radial gap of 2 mms or more between the inner face of the coil and the outer face of the plunger. From another aspect of the present invention, it is preferred to form the coil directly upon or within the wall of the tubular member within which the plunger reciprocates as described below, so as to reduce this radial gap to less than 1 mm.

The nozzle orifice is typically provided by the open end of the outlet bore from the valve head chamber. Such a bore can be provided by a capillary tube outlet to the valve head chamber, or by the bore in a jewel nozzle of the type conventionally used in ink jet printer nozzles. Such a jewel can be set into the distal end of a bore in a nozzle plate upon which the valve mechanism is mounted. It will be appreciated that the jewel nozzle can provide both the outlet bore from the valve head chamber and the nozzle orifice itself, for example when a jewel nozzle is set into a bore within a nozzle plate so that its proximal face is substantially flush with the proximal face of the nozzle plate, for example where it forms all or part of the distal end wall of the valve head chamber.

We have found that if the volume of the body of fluid retained in the bore between the valve head chamber and the nozzle orifice is excessive, that body of fluid possesses sufficient inertia to damp out rapid movement of the plunger required when the valve is operated at high frequencies. This causes the fluid to issue erratically from the nozzle orifice at frequencies of operation in excess of about 1 kHz. Surprisingly, if the length l of the bore is less than 5 times the diameter d of the bore, for example 0.5 to 5 times the diameter of the bore, the volume of ink retained in the bore between actuations of the plunger is reduced sufficiently so that it can respond rapidly to actuations of the plunger.

Where the plunger is to be actuated at frequencies in excess of 1 kHz, we have found that if the length to diameter ratio of the bore is reduced to below about 1.5:1, spraying of the droplets at the nozzle orifice may occur, even though the frequency of droplet formation is below than at which an impulse jet printer having an even smaller length to diameter ratio for the outlet nozzle operates without causing spraying of the ejected droplets. We therefore prefer that the length to diameter ratio of the bore be from 2:1 to 4:1. It is particularly preferred that the length to diameter ratio be less than about 3:1, preferably 2:1 to 3:1. To reduce the volume of ink within the bore, we have found that the diameter of the nozzle orifice should be less than 80 micrometres, preferably about 40 to 60 micrometres. Surprisingly, we have found that the use of these combinations of bore length to diameter and nozzle orifice sizes reduces the formation of satellite droplets from the nozzle as well as reducing the damping effect on the motion of the plunger and enables droplets of a wide range of sizes to be produced consistently at frequencies in excess of 1 kHz, notably at 2 kHz or more.

With conventional valve designs, one problem has been the imperfect formation of the desired droplets after the valve has been idle for any length of time. This has been ascribed to drying out of the ink at the nozzle orifice and many steps have been taken to reduce this. We have found that the use of the bore and nozzle orifice dimensions described above has the surprising effect of reducing the imperfect initial droplet formation. We believe that this is due to a reduction in the drying out of ink within the valve mechanism. Furthermore, we have found that the use of a length to diameter ratio of from 2:1 to 5:1 enables control of the directionality of the ejection of the droplet from the nozzle orifice to be achieved. In a conventional design of drop on demand print head, the length to diameter ratio of the bore is typically about 10:1. It is surprising that reducing the length of the bore does not result in loss of directionality of the ejection of the droplet from the nozzle orifice.

Surprisingly, we have found that the removal of part of the core of the plunger to form an internal bore within part of the length of the plunger and thus reduce the mass of the plunger, does not affect the magnetic properties of the plunger to a significant extent and that the plunger behaves magnetically as if it were a solid member. For example, the axial bore can be formed as a blind ended drilling in a solid rod of a suitable material. Such a form of construction of the plunger is much simpler than the complex two component construction described in PCT Application No SE97/01007. The amount of metal removed from the plunger depends upon a number of factors, for example the strength required for the resultant hollow plunger, the magnetic force required to move the plunger against the bias of the spring and the acceleration and deceleration required at each end of the travel of the plunger. However, the bore should not extend significantly into that portion of the plunger which lies within the coil when the plunger is in its fully retracted position. We have found that if the bore extends significantly beyond this point, the magnetic coupling between the coil and the plunger, and hence the force driving the plunger at the initiation of its extension stroke towards its extended position, is reduced.

Removal of material from the plunger reduces the mass and hence inertia of the plunger. However, removal of material would have been expected to reduce the magnetic force which can be applied to the plunger by the coil and hence to result in a plunger that could not be accelerated sufficiently by the magnetic field applied to it. We have found that this is counteracted by the use of materials of construction for the plunger which have a high saturation flux density as described above. Preferably, the plunger/coil combination has a high magnetic inductance, typically 9 milliHenrys or more. Suitable materials for use as the plunger material include magnetisable iron or steel alloys, notably those of iron and nickel containing from 40 to 55% of nickel, especially those containing from 45 to 50% nickel and from 55 to 50% of iron. If desired, other metals such as chromium or aluminium may also be present in minor amounts. Preferred materials for present use are those which have a saturation flux density in excess of 1.6 Tesla, for example 1.8 Tesla or more. The preferred materials also have a coercivity less than 0.25 amperes per metre, and a permeability in excess of 50,000, for example 100,000 or more. Suitable materials for present use include those ranges of alloys sold under the Trade Names Permenorm 5000 and Vacofer SI. Where high Tesla materials are used, it may be desirable to provide the plunger with a corrosion resistant external layer or surface.

If desired, composite materials, such as polymers or sintered or fritted ceramics or silicon matrices, which have particles of a suitable ferromagnetic or other magnetisable material dispersed therein or which have otherwise been modified to have the desired high saturation flux density and/or magnetic inductance may be used. For example, a plunger may be formed from laminates of materials of different properties to achieve the desired overall magnetic properties.

The plunger typically comprises a generally cylindrical member which is made from a suitable magnetic material and which is a sliding fit within the coil or the tubular member within or upon which the coil is supported. The plunger can be of any suitable length and cross section which is preferably congruent to the internal cross section of the tubular support for the coil. However, it is particularly preferred to form the plunger with as a low a mass as is practicable so as to enhance the speed of response of the plunger to changes in the electric current applied to the coil. Thus, the plunger may have an axial bore therein as described above. Alternatively, the plunger may be formed as a polymer, ceramic or other matrix containing a suitable ferromagnetic material incorporated therein. However, it is particularly preferred to form the plunger as a unitary solid body from a soft ferromagnetic material with a diameter of less than 2.5 mms, notably about 1 mm, and a length to diameter ratio of more than 3:1, preferably from about 5:1 to 10:1, so that the plunger slides freely within the tubular support member of the coil.

In a preferred embodiment, therefore, the invention provides a compact, light weight solenoid valve of the invention characterised in that the plunger has a diameter of less than 2.5 mms, notably about 1 mm, and has a length to diameter ratio of more than 3:1, preferably from about 5:1 to 10:1.

The plunger is conveniently formed by machining, rolling or extruding the desired alloy to form a length of material having the desired size and shape. During the machining of the preferred materials of construction to form the plunger for the valve, the magnetic properties of the material may be affected. It may therefore be desired to subject the manufactured plunger to some form of post forming treatment so as to recover the magnetic values. Such treatments include heat treatment or mechanical impact treatment which cause a change in the crystal composition of the material. The optimum form of post forming treatment can be readily determined using simple trial and error.

The distal end of the plunger may be provided with a plastic or rubber end face which forms a fluid tight seal when it bears against the transverse end wall of the valve head chamber. If desired, that end wall can be provided with one or more upstanding circumferential ribs or seal members generally concentric with the inlet to the outlet bore of the valve head chamber so as to enhance the sealing engagement of the end face of the plunger with the end wall of the valve head chamber. However, where the bore is provided by a length of capillary tube, the end of the tube can protrude into the valve head chamber to provide an annular sealing surface with which the distal end face of the plunger engages. The optimum form of the sealing arrangement can readily be determined by simple trial and error tests and a combination of two or more forms of sealing arrangement may be used if desired. The raised ribs or other sealing arrangement can be formed using any suitable technique, for example during the moulding of the transverse end wall. Surprisingly, we have found that the use of annular raised sealing ribs on the distal end of the plunger and/or on the transverse face of the valve head chamber with which it engages has the effect of reducing the formation of satellite drops from the nozzle orifice, especially at operation of the valve at frequencies in excess of 1 kHz.

The valve mechanism has a coil through which an electric current is passed to generate the magnetic field which acts upon the plunger. Such a coil can be of conventional design and construction and serves to generate the magnetic field required to move the plunger when a current flows through the coil. Preferably, the coil is a single winding of a suitable wire wound on a suitable bobbin which may be removed and the resultant free coil potted in a suitable resin to provide a radially compact coil having a central axial bore which provides the tubular member within which the plunger reciprocates. If desired, the coil can be wound with two or more taps so that different electric currents can be applied at different points axially along the coil. For convenience, the invention will be described hereinafter in terms of a single coil having a single pair of connectors to connect to a source of current.

However, as indicated above, we prefer to minimise the radial gap between the coil and the plunger so as to optimise the magnetic coupling between the coil and the plunger. This can be achieved by winding the coil directly upon the tubular member within which the plunger reciprocates, with a thin insulating interface between the wire of the coil and the tubular member where a metal tube is used. Alternatively, the coil can be formed by winding a bare wire coil upon an insulating tubular member and then retaining the coil in position by applying a retaining coat of resin or other binder upon the wound coil. Alternatively, the coil can be wound upon a mandrel, removed and then potted in a suitable resin which then forms the wall of the tubular member within which the plunger reciprocates. In a particularly preferred embodiment, the tubular member is formed from a ceramic material, for example as a ceramic frit tube. The coil can be formed by depositing a conductor track, for example by vapour phase or electrical deposition of a copper or silver conductor or track, upon the surface of the fritted tube or into grooves etched, machined, laser cut or otherwise formed in the external surface of the ceramic tube. Alternatively, the coil may be formed as a copper, silver, gold or other conductive track upon a flexible circuit board which is then rolled upon a mandrel to form a cylindrical tubular member incorporating the coil. In all such designs the gap between the coil has been reduced, typically to a radial dimension of less than 1 mm, typically less than 0.5 mm, for example 100 to 200 micrometres, as compared to the 2 mm or greater gap in a conventional solenoid coil. Such a reduction in the gap results in greater efficiency in coupling the plunger magnetically to the coil, resulting in lower power consumption and greater speed of response of the plunger to changes in the current flowing in the coil. Such constructions also result in a unitary construction for the coil and the tubular member within which the plunger reciprocates, thus simplifying construction and assembly of the valve and enables a more compact construction to be achieved. Furthermore, since a smaller driving force is typically required to move the plunger in a valve of the invention, it is often possible to form the coil with a single layer of wire or other conductor. This further assists the formation of a compact construction.

If desired, the tubular member supporting the coil can be longitudinally extended to provide the radial walls of the valve head chamber. In one embodiment of such a construction, the tubular member is formed as a cylindrical tube having one end closed to form the transverse terminal wall of the valve head chamber, the wall being pierced by a bore whose free end provides the nozzle orifice. Such an assembly can readily be formed by electo or laser etching of a silicon or ceramic member to high accuracy using automated techniques.

The valve mechanism of the invention is preferably used in co-operation with a plurality of closely adjacent valve mechanisms, each serving one or more discrete nozzle orifices, to form an array type print head capable of applying a plurality of dots of fluid simultaneously to a substrate to create a two dimensional image. Such an array can be formed by mounting the outlet end of the valves upon a nozzle plate with a bore through the plate providing the outlet bore from the valve head chamber of the valve to the nozzle orifice. Typically, a jewel nozzle is set into the nozzle plate to provide both the bore from the valve head chamber and the nozzle orifice. In a particularly preferred embodiment, the nozzle plate is provided with a series of upstanding tubes, each in register with one of the bores through the plate. The tubes serve as the tubular member support for the coil of the valve and the plunger reciprocates within that tube. The distal end portions of the tubes adjacent the nozzle plate, or the proximal portion of the bore in the nozzle plate, serves as the valve head chamber of the valve mechanism. Such arrays can be formed from ceramic or silicon materials using automated techniques and the nozzle orifice can be provided either by a jewel nozzle set into a bore through the nozzle plate or by forming a suitable nozzle orifice in the end of a blind end bore in the nozzle plate using a laser. Such assemblies can be formed on a very small scale enabling miniaturisation of the valve structure to be achieved which aids the printing of small dots, typically less than 60 micrometres in diameter, on the substrate to be printed, enhancing the definition of the printed image.

It is also preferred to provide each valve mechanism with a metal housing to the coil thereof. This acts not only as a return path for the magnetic field generated by the coil within it, but also acts as a magnetic screen so as to reduce cross talk between the magnetic fields generated by one coil and the coil of an adjacent valve mechanism. Typically, such a metal housing is made from .mu. metal, aluminium or stainless steel and also acts as a rigid housing for the components of the valve mechanism. Thus, the housing can be of a generally cylindrical form and can be crimped radially inwardly at each end thereof to retain end pieces and the coil axially clamped upon one another, one end piece carrying an axial fluid inlet, the other defining the valve head chamber and carrying an axial capillary tube or jewel nozzle which forms the outlet bore between the chamber and the nozzle orifice. Alternatively, the distal end of the metal housing can be crimped or otherwise secured to the nozzle plate where the nozzle plate carries upstanding tubular members as described above.

The valve mechanism of the invention preferably also comprises a means, notably a spring, for biasing the plunger towards its rest position. Typically, the spring is a compression spring and acts to bias the plunger against the inlet at the proximal end of the bore to the nozzle orifice, so that the rest position of the plunger is in the valve closed position. When a current is applied to the coil, this opposes the bias of the spring and moves the distal end of the plunger away from the bore inlet to open a flow path from the valve head chamber to the nozzle orifice. However, it will be appreciated that the rest position may be the valve open position and the operative position is the valve closed position. For convenience, the invention will be described hereinafter in terms of the rest position being the valve closed position.

The spring member is pre-tensioned, for example from 50 to 80% of the travel of the compression of the spring is taken up by the pre-tensioning, since we have found that such pre-tensioning enables the spring to apply a consistent bias force against the movement of the plunger over the remainder of the compression of the spring during movement of the plunger. We have found that the use of a conical spring is of especial benefit since such springs can readily be fitted within the dimensions of the valve head chamber and will tend to be self centring during the assembly of the valve mechanism, whereas conventional cylindrical coil springs do not. Furthermore, the use of a conical spring reduces the mass and hence inertia of the spring; further aiding rapid response of the spring to movement of the plunger. It is particularly preferred to use a conical coil spring which is pre-tensioned to the last two turns of the spring, since we have found that such a spring responds rapidly to the movement of the plunger and the pre-tensioning enables the spring to exert a significant bias force over a small additional compression of the spring.

However, it will be appreciated that the bias effect could be applied alternatively or in addition to that applied by the spring by applying a current to the coil which opposes the movement of the plunger. Such opposing current can be applied under the control of electronic switching using conventional techniques and software, for example as described below.

The valve of the invention also comprises a valve head chamber in which the distal end of the plunger co-operates with the bore leading from the valve chamber to the nozzle orifice to open and close a flow path for fluid to the nozzle orifice. This valve chamber may take the form of a simple cylindrical extension of the metal housing described above to provide the magnetic screen between adjacent valves in an array of valves or of the tubular support member for the coil. A transverse end wall carrying the axially extending bore to the nozzle orifice is secured to that housing, for example by a crimping operation, to form a closed chamber at the distal end of the coil. Alternatively, as described above, the tubular support member can extend axially beyond the coil to form the side wall of the valve head chamber. A transverse end wall can be formed integrally with or secured to the distal end of the tubular support member and the nozzle orifice formed in that end wall, for example by a laser.

The outlet to the valve head chamber can be provided by an axially extending tube, the proximal end of which passes through the transverse end wall and the distal end of which forms or is provided with the nozzle orifice. Where the outlet is provided by an axially extending tube, for example a stainless steel capillary tube, this can be used to mount the valve assembly upon a nozzle plate or other support. Alternatively, the metal housing providing the magnetic screen around the coil may be provided with lugs or other means for mounting the valve mechanism. Where the valve mechanism comprises tubular coil supports extending transversely from a nozzle plate as described above, these and the nozzle plate provide the means for mounting and securing the valve mechanism in the desired location.

In a preferred embodiment of the invention, the valve mechanism is mounted on a nozzle plate having a plurality of nozzle bores which are formed substantially simultaneously in a single operation so that the nozzle plate has a unitary construction without the use of jewel nozzles. Such a simple unitary nozzle structure can readily be made using a wide range of techniques and overcomes the problems associated with misalignment of jewel nozzles in a multi-nozzle print head. In such a preferred embodiment, the nozzle orifice and bore through which the ink is ejected upon operation of the valve are formed as a unitary structure, for example concurrently as a bore is cut or otherwise formed in a plate upon which the valve mechanism is to be mounted. For example, the bore/nozzle orifice is formed in a nozzle plate by a laser, electro-forming or etching, needle punching or other techniques. The nozzle plate can be from 50 to 400 micrometres thick so as to achieve the desired length to the bore. At such thickness, the nozzle plate takes the form of a metal or other foil which is mounted in a suitable support member to provide a rigid and mechanically strong nozzle plate assembly. We have found that by forming the nozzle bores simultaneously in a multi-nozzle nozzle plate, problems due to misalignment of the bores with one another are minimised.

We have also found that by selection of the bore forming technique, the walls of the bore are sufficiently smooth to reduce flow separation and the formation of eddies at the interface between the bore walls and the fluid flowing through the bore. Furthermore, such techniques may also be used to form other features on the nozzle plate which enhance the operation of the valve. For example, electro-forming or etching of a metal foil can be used to form the bores/nozzle orifices in the plate and also to form a raised lip or ridge around the inlet to the bore leading to the nozzle orifice. This provides a localised pressure point between the distal end face of the plunger and the nozzle plate to assist the formation of a fluid tight seal when the plunger is in the valve closed position. Alternatively, where a needle is used to form the bore in a metal foil, this will cause the foil to deform and form a belled entry to the bore which will assist smooth flow of fluid into the bore from the valve head chamber. The penetration of the needle through the foil may also polish the surface of the foil, and hence the internal wall of the bore which is formed, as the surface of the needle slides over the material of the foil. Similarly, the use of a laser to form the bore in a metal, ceramic or plastic foil may also form a polished surface to the walls of the bore, notably where the laser beam is pulsed for very short periods, typically less than 1 nanosecond, to reduce the formation of deposits around the lip of the bore of material which has been ablated from the plate in forming the nozzle bore.

Such assemblies can be formed on a very small scale enabling miniaturisation of the valve structure to be achieved. It is preferred to provide the nozzle plate as a metal, ceramic or other foil having the bores formed therethrough as described above and to mount that plate so that the bores therein are in register with the distal ends of the plungers of the valves. In this case, the valve head chambers can be individually formed in the surface of the foil or in an intermediate plate located between the valve coil support members and the nozzle plate. However, we have found that the flow of ink or other fluid to the individual bores and nozzle orifices is enhanced if the intermediate plate is formed with a continuous chamber which provides a combined valve head chamber for all the valves in the print head assembly. In such a construction, the seal between the distal end face of each plunger and the registering bore in the nozzle plate provides adequate isolation of flow through each of the nozzle bores and orifices.

If desired the raised sealing ribs or areas on the nozzle plate can be formed from a flexible material to cushion the impact of the end face of the plunger against the nozzle plate. Such deformation may also assist formation of the fluid tight seal where the end face of the plunger does not carry a rubber or similar pad. If desired, the pad carried by the end face of the plunger can be formed from a material which undergoes cold creep or deformation under the load of the bias spring urging the plunger into the valve closed position. Such creep may form a nipple or other projection which extends into the proximal portion of the nozzle bore in the nozzle plate. Upon reciprocation of the plunger, this projection repeatedly wipes at least the initial part of the proximal portion of the nozzle bore and displaces solid deposits which may have deposited upon the wall of the bore and this may assist in reducing initial drop deformation after rest periods of the valve. To assist the operation of this projection, the mouth to the inlet to the bore through the nozzle plate may be belled, as may occur when a needle is used to form the bore in the nozzle plate.

Fluid can be fed to the valve head chamber by any suitable means, for example by one or more radial inlet ports in the side wall of the chamber. Alternatively, fluid can be caused to flow axially past part or all of the plunger within the coil so that the fluid lubricates the movement of the plunger within the coil and can also act to cool the coil at high current loadings and/or high frequencies of operation of the valve. Thus, the bore in the tubular support for the coil can have a generally circular cross section and the plunger may have a squared or hexagonal cross section, axial flattenings, grooves or flutes which form axial fluid flow paths along the plunger. Where this is done, the proximal end of the valve mechanism can be provided with an axial inlet to feed fluid axially into the space(s) between the plunger and the coil.

Such a valve is capable of being operated at high frequencies, typically 2 to 9 kHz and finds especial application as the solenoid valve in a drop on demand ink jet printer head. In such an application, the valve is desirably as small and compact as possible so as to reduce the overall size of the print head and the inertia of the components of the valve mechanism. The valve is incorporated into any suitable form of drop on demand printer to control the flow of ink through the nozzle orifices of that printer. As described above, the valve mechanism can be incorporated into a compact structure forming an array print head which is operated under the control of a computer which determines the open time of each of the valves and the sequence of opening of the valves to print the desired image. Such a computer can operate in the conventional manner. However, as described below, the computer may be used to achieve many other functions in the control of the operation of the printer.

Accordingly, from another aspect, the invention provides a drop on demand printer characterised in that the flow of ink through the nozzles of the printer is regulated by a valve of the invention.

For convenience, the invention has been described in terms of such use of the valve mechanism. However, it will be appreciated that the valve mechanism of the invention may be used wherever a small, high speed valve is required, for example in the dosing of measured amounts of a reagent in a chemical or biological analysis or other process, notably in the assessment of medicaments or in diagnostic testing or analysis. The valve of the invention also finds use in applying a predetermined quantity of a reagent in the verification of the authenticity of a sample.

Surprisingly, we have found that the application of droplets of ink at high frequencies to long pile fabrics, for example carpets and felted or woven fabrics, enables satisfactory application of the dye to the fibre without the need to use very high viscosity inks. Thus, in place of inks having viscosities in excess of 250 Cps hitherto considered necessary to achieve good dying of the fibres, we have found that good results can be achieved using inks of from 60 to 120 Cps applied at frequencies of about 2 kHz. The ability to use low viscosity inks enables the printing to be achieved using smaller nozzle orifices, which increases the definition of the pattern printed on the fabric. It also enables the operator to select inks from a wider range than hitherto and to operate the printer at lower ink pressures, which reduces the need for special modification of the printer and the risk of failure of components.

Many fabrics, both woven and non-woven, have a surface which presents free ends of fibres generally normal to the plane of the fabric. Such fabrics include felted materials where fibres in a randomly orientated mass are compressed, optionally in the presence of a bonding agent such as an adhesive; materials woven from strands made up from a plurality of individual fibres where the surface of the fabric has been, brushed, teased, abraded or otherwise treated to separate some of the fibres from within the strands to form a fluffy surface to the material, for example a brushed nylon; woven materials made from materials which are inherently fluffy, such as knitted or woven angora, merino or cashmere wools or cotton terry towelling; and carpet type materials such as velvets, velours and tufted carpets where individual lengths of strands or fibres are knotted, sewn, glued or otherwise secured to a sheet member, typically a reticulate backing sheet, whereby the free ends of the strands or fibres form a pile which extends generally normal to the plane of the backing or where loops of the strands or fibres are formed extending generally normal to the plane of the backing and the free ends of the loops severed to form the pile. For convenience the term pile fabric will be used herein to denote all such types of material where individual fibres or strands comprising groups of fibres extend generally normal to the plane of the material to provide a pile effect surface to the material.

It is often desired to form patterns or images upon the surfaces of pile fabrics, for example a coloured pattern. This can be achieved by interweaving different coloured, textured or other material strands of wool or other material into the fabric as it is being made. However, this is difficult and time consuming, especially where the pattern is complex and/or a plurality of colours or textures are desired. Such use of a plurality of different strands is becoming progressively uneconomic in the large scale manufacture of commodity materials, such as patterned carpets.

It has therefore been proposed to manufacture the pile fabric from neutral or uniformly coloured fibres or strands and to apply a colour to the pile fibres after the fabric has been woven or otherwise manufactured. The colour is typically an ink applied by any suitable printing technique. A printing technique which is used is an ink jet printing technique using a drop on demand type of printer. The ink is desirably applied at the rate of about 300 to 400% by weight of the fibre to be coloured and needs to penetrate substantially uniformly throughout the strands formed from the individual fibres. If a very mobile ink having a viscosity of about 10 cPs at 25° C. (as is commonly used in an ink jet printer) is used, it will run down the length of the strands and form an intense coloration at the base of the pile, leaving the top portion of the pile inadequately dyed, and little penetration of the colour into the strands will take place. It is therefore necessary to increase the viscosity of the ink in order to ensure that it runs down the fibre at a sufficiently slow rate for uniform penetration of the ink into the strands and coverage of the surface of the individual fibres takes place. The longer the pile, the greater this problem becomes. With long pile fabrics, that is those with a pile length of about 2 mms or more, it is necessary to use inks having a viscosity of from 250 to 500 cPs at 25° C.

Such viscous inks are difficult to jet through the very fine orifice nozzles of a conventional ink jet printer and pressures far in excess of those for which the printer is designed would be required. Furthermore, if a low viscosity ink were applied at such high pressures, it would issue from the nozzles as high powered jets and cause the individual strands to bend over and thus prevent the ink from contacting other strands in the pile. It is therefore customary to use nozzles having orifices which are progressively greater as the length and closeness of the pile increases. Thus, for a carpet having a pile length of 3 mms or more it is necessary to use an ink having a viscosity of about 300 cPs, a pressure of about 2 bar and nozzle diameters of typically 500 micrometres in diameter so that the viscous ink can be ejected in sufficient amounts to attain the desired loading of ink on the individual strands.

Whilst the use of large diameter nozzles for high viscosity inks enables the ink to be deposited on the strands of the pile to achieve substantially uniform coloration of the individual strands and fibres, the size of the droplets issuing from the nozzle are sufficiently large to cause perceptible loss of definition in the printed pattern. Furthermore, the size of the droplets also results in adjacent droplets applied to the pile contacting one another to cause colour bleeding where the droplets are of different colours.

Surprisingly we have found that the use of a drop on demand print head which operates at frequencies greater than 1 kHz, notably a print head incorporating a valve of the invention, enables the size of the droplets being printed and hence the pressure required to eject them through comparatively small nozzle orifices to be reduced. This reduces the problems of colour bleed and enhances the definition of the printed image or pattern. Furthermore, we have found that it becomes possible to omit individual printed droplets from the printed pattern and thus print a blank area within the image which is not visually perceptible but which acts to provide a gap within the printed strands to act as a barrier to colour bleeding. Such a gap may also be printed as a black line defining the edges of areas printed with different colours, which enhances the perceived definition of the printed image or pattern.

Accordingly, from another aspect, the present invention provides a method for applying an image forming composition to a pile fabric using a drop on demand ink printer, characterised in that the printer is operated at a drop generation frequency of at least 1 kHz. Preferably, the pile fabric has a pile length of at least 2 mms and the printer is operated at a pressure of less than 3 bar, notably at from 1.5 to 2.5 bar.

A particularly preferred drop on demand ink jet printer is one utilising a valve of the invention to control the flow of an ink through the individual nozzle orifices and the nozzle orifices have a diameter of from 250 to 600 micrometres, notably about 500 micrometres; and in which the plunger of the solenoid valve has a diameter of less than 2.5 mms. We have also found that the use of such a printer enables individual control of the printing of the dots of the image so that accurate over-printing of dots can be achieved. It is thus possible to enhance the colour range and strength which can be achieved. Such a printer thus enables an infinite scaling of the colour hues which can be achieved.

The invention can be applied to the application of any form of image to any pile fabric. However, the invention is of especial application in the application of a water and/or solvent based ink composition to form a patterned image on a long pile fabric having a pile length of about 2 to 5 mms as measured from the top surface of the sheet member to which the strands or fibres forming the pile surface of the fabric are secured. Such pile fabrics can be velvets or twist pile carpets, but for convenience the this aspect of the invention will be described in terms of printing a multi-colour pattern on a tufted pile carpet in which the strands containing a plurality of individual fibres are secured to a reticulate backing sheet by adhesive. Such carpets can be made by any suitable technique and the invention can be applied during the fabrication of the carpet after the strands have been secured to the backing sheet or can be applied after the carpet has been manufactured in a separate colour printing operation. As indicated above, the strands are made from a neutral tint fibre, for example from a natural washed wool fibre, optionally in admixture with one or more natural coloured polymer fibres, for example polyester or polyamide fibres. If desired, the fibres or the strands formed from the fibres may be given one or more treatments to render the fibres receptive to the ink composition to be applied to them. The fibres, their formation into strands, the treatment of the fibres or strands and the formation of the carpet can all be those conventionally used in the manufacture of a tufted carpet.

For convenience, the this aspect of the invention will be described hereinafter in terms of the application of ink to a neutral washed wool fibre tufted carpet shortly after the pile has been formed on a reticulate woven polypropylene backing sheet.

In a preferred embodiment, this aspect of the invention, the printer is one in which the solenoid valve mechanism for controlling the flow of fluid to the nozzle orifice comprises a plunger member journalled for axial reciprocation between a rest and an operative position within an electric coil under the influence of a magnetic field generated by that coil when an electric current passes through the coil, the distal end of the plunger extending into a valve head chamber having an outlet nozzle bore, the reciprocation of the plunger being adapted to open or close a fluid flow path from the valve head chamber through that bore, characterised in that:

a. the plunger is of a unitary construction and is made from an electromagnetically soft material having a saturation flux density greater than 1.4 Tesla, preferably about 1.6 to 1.8 Tesla, a coercivity of less than 0.25 ampere per metre, and a relative magnetic permeability in excess of 10,000; and b. the nozzle bore leading from the valve head chamber to the nozzle orifice has a length to diameter ratio of less than 8:1, preferably from 1.5:1 to 5:1, notably from 2:1 to 4:1.

The term magnetically soft is used herein to denote that the material loses the magnetic field induced in it by the coil when the current in the coil ceases, in contrast to a permanent magnet which retains its magnetism.

The use of materials having high magnetic flux saturation densities enables the plunger to respond rapidly to changes in the magnetic field generated by the coil without the generation of excessive heat. The low coercivity of the plunger material also aids the rapid rise and fall of the induced magnetic field within the plunger under the influence of the field generated as a current is passed through the coil at low applied coil currents. This, coupled with the high permeability of the material, enables a high magnetic drive force to be generated rapidly between the coil and the plunger. As a result, the plunger can be accelerated rapidly by the coil without the need to apply high drive currents to the coil, typically in excess of 20 amperes, as hitherto considered necessary. This again reduces the heat energy which is generated as the plunger is moved by the coil. The low coercivity also permits a reverse magnetic force to be generated rapidly by reversing the direction of the current in the coil. This reversed force can be used to slow down the movement of the plunger as it reaches either or both extremes of its travel as described below.

Furthermore, we have found that the above design of valve can be held in the open position for prolonged periods to print continuous lines on the substrate which have a length equivalent to at least three individual printed dots. With conventional solenoid valves, it has been considered necessary to pulse the current to the coil so as to form overlapping dots of ink on the substrate. In practice this often leads to the valves burning out due to the high currents applied to the coil to move the plunger from its initial rest position into the valve fully open position. We have found that the amplitude of the current flowing through the coil required to hold the plunger in the valve open position is surprisingly much less, typically 80 to 50% less, than the current required to move the plunger initially away from its rest position. By applying a current pulse which has an initial amplitude sufficient to move the plunger from its rest position to the valve open position and then reducing this amplitude to a lower value for the remainder of the pulse, it is possible to hold the valve open for prolonged periods so as to print lines of ink on the substrate.

Furthermore, by reducing the length of the nozzle bore, the pressure drop across the nozzle is reduced, allowing a faster exit velocity to be achieved at the nozzle orifice. Surprisingly this is achieved without causing spraying of the droplets, that is the break up of the droplet at the nozzle orifice into a plurality of smaller droplets. This enables a higher frequency of droplet generation to be achieved at a given ink pressure for a given length of flight path.

In a conventional drop on demand printer, the operation of each solenoid valve is triggered in response to a signal from a computer or microprocessor, which determines which valve is opened and when so as to print the desired image. We have found that the control the operation of the valve using software has a number of other significant benefits which enable the valve of the invention to deliver high quality printed images at much higher frequencies that has hitherto been considered possible for a drop on demand print head.

Thus, it is particularly preferred to use software to calibrate the valve so that under specific conditions it delivers a consistent droplet of ink through the nozzle orifice. With conventional designs of solenoid valve, it is necessary to compensate for minor variations in dimensions and materials of the manufactured valve by physically adjusting the axial travel of the plunger so as to vary the size of the flow path created when the plunger is withdrawn from sealing engagement with the transverse end wall of the valve head chamber or the tube leading to the nozzle orifice. This will affect the size of the dot ejected from the nozzle orifice and the objective of the calibration process is to achieve a uniform droplet size from all the nozzle orifices in a print head under the same printing conditions. The conventional design of solenoid valve incorporates a stop within the bore of the tubular support for the coil, which stop provides a physical limit to the axial movement during retraction of the plunger. In such a conventional valve design, the air gap between the proximal end of the plunger and the stop is adjusted, for example by making the stop a stiff push fit or a screw fit within the tubular support, so that it can be moved axially within the bore of the tubular member to achieve the desired air gap. Such adjustment of the air gap is tedious and time consuming and is prone to operator error.

We have found that software can be used to set a specific point in the retraction of the plunger at which the plunger movement halts. This point can readily be adjusted by simple modification of a parameter of the software, for example by keyboard input of a new value for that parameter. Such adjustment can be achieved very accurately and the calibration carried out for a number of sets of printing conditions so that the current pulse size and duration required to achieve given droplet sizes can be determined and stored, for example in as a machine readable code on a magnetic disc, look up table in a memory chip or other storage medium, for future use with that valve. The calibration can be achieved simply and at smaller increments of droplet size than is possible with screw adjustment of the stop in conventional design of solenoid valve.

In carrying out the calibration, droplets are printed onto a substrate whilst operating the valve under standard conditions and at a given electric current pulse amplitude and duration applied to the coil. The printed dot is examined by any suitable means and the amplitude and/or duration of the electric pulse raised or lowered to achieve the desired dot size. Such a process can be carried out manually. However, it is preferred to carry out this process automatically by inspecting the printed dot using a CCD camera or other inspection means and comparing the form of the printed dot with parameters for the required dot. Such comparison and subsequent adjustment of the current pulse can be carried out using a suitably programmed computer. It is especially preferred to monitor the diameter and circularity of the printed dot and the presence of satellite small dots adjacent the desired dot using a CCD array or camera and comparing the dot characteristics with those held in a look up table which identifies the correction which needs to be applied to the current pulse applied to the coil to achieve the desired printed dot characteristics. The optimum variation in the operation of the valve mechanism, for example to increase or reduce the open time of the valve, can be determined by trial and error tests. These optimum values of the variation then stored in a look up table or other storage medium to provide one of the parameters against which the printed dot and the operation of the print head is assessed.

The use of a CCD camera or array and computer to inspect the droplet of ink as it is ejected and/or the printed dot and to modify the current applied to the coil of the valve also has applications during the operation of the valve on-line during printing of images. Thus, the computer can be programmed to decelerate the movement of the plunger at each end of its travel. We have found that this reduces splatter of the ink from the nozzle orifice due to sharp impact of the plunger against the seal members at the entry of the bore between the valve head chamber to the nozzle orifice. The use of software can also be used to compensate for fluctuations in the viscosity of the ink due to temperature variations or other reasons; variations in voltage applied to the different coils in an array of print heads which are operated simultaneously; and to compensate for other changes in operating conditions, for example the use of a different ink, which require changes in the form and size of the electrical pulse applied to the coil of the valve. The use of software can also be used to hold a valve in the open position to print a continuous line of ink in place of the series of overlapping dots achieved with present print head operating techniques; and to vary the open time of the valve for the initial droplets ejected from the nozzle orifice following a rest period of the valve.

In all cases the operation of the valve is modified by the computer in response to a signal from the CCD camera or other mechanism used to inspect and monitor the droplet of ink as it is ejected and/or the printed dot and to compare the observed droplet or dot to parameters held in a memory of the computer or another storage medium so as to determine what modification, if any, is required to the current applied to the coil so as to achieve the desired dot.

The invention thus provides a print head of the invention operated under the control of a computer in combination with a mechanism for observing the printed dot of ink or other fluid applied to the substrate, the computer being programmed to detect differences between the observed dot and the desired dot and to apply a correction to the current applied to the coil so as to maintain the desired observed dot parameters.

Such a combination enables the printed dot quality to be monitored and corrected on-line during operation of the printer. Hitherto, the print quality was observed objectively by the operator of the printer and a correction to the operation of the printer applied manually. The ability to use the software on-line to achieve monitoring and correction of print quality is a major benefit to the operator and can achieve virtually instantaneous correction of fluctuations in print quality.

The monitoring and correction may be achieved using conventional software and hardware techniques and designs. The dot quality can be monitored continuously and a correction applied in response to the average of three or more successive dots. Alternatively, the printed dot quality can be monitored at intervals, for example every second or at intervals of every twenty operations of the valve, and any correction applied once the printed dot deviates by more than say 5% for any one or more of the parameters used to assess the quality of the printed dot.

Typically, the monitoring of the printed dot quality will be used to apply a signal to vary the open time of the valve.

It will be appreciated that the signal indicating that some variation of the operation of the valve is required may be provided from an external source rather than from the on-line scanning of the printed dot. Thus, a sensor may monitor the operating temperature of the printer and/or of the ink fed to the valve, since this will affect the viscosity and hence the jettability of the ink. Alternatively, such sensors may monitor: the voltage applied to the valve mechanism, for example the voltage drop which occurs when a plurality of valves are operated simultaneously from a single power source; the time for which a specific valve has rested between printing operations, the frequency of operation of a valve and so on. These sensors may then address a series of look up tables which then set the variation of the open time required to reduce defects in quality of the printed dot if that parameter being monitored varies from a predetermined optimum value.

It is preferred that the quality of the printed dot from each nozzle be monitored individually. However, if desired the printed dot quality from groups of nozzles may be monitored collectively.

In the conventional computed control of the operation of a valve in a drop on demand printer, simple single bit signals are used to open and shut the valve since all that has been required hitherto is that the computer instruct the valve when to open and shut the valve so as to print a dot of the required size. However, the ability to vary the operation of each valve individually during the operation of the printer in response to many inter-related factors requires the transmission of more complex signals than simple open and shut instructions. We have found that it is desirable to transmit signals in byte format so that the amount of information transmitted can accommodate the permutations of operating parameters desired. Thus, for example, the use of byte form signal transmission offers 256 possible graduations of open time of the valve. This enables the amount of ink deposited in each printed dot to be varied over a finely graduated range by providing a look up table with 256 individual addresses therein from which the computer controlling the operation of the printer can instruct the open time of the valve to be selected. This enables a true grey scale image to be printed using a drop on demand print head, which has not hitherto been considered practical. The use of byte signal transmission enables a wide selection of values for variation of a given operating parameter to be transmitted and responded to rapidly and accurately, further enhancing the speed and accuracy of operation of the print head. This, coupled with the high frequency printing of consistent quality dots over a wide range of sizes and speeds enables the present invention to extend the use of drop on demand printers into fields of use for which they have hitherto not been considered possible whilst retaining the flexibility of printed dot size which cannot readily be achieved with other forms of printer.

DESCRIPTION OF THE DRAWINGS

A preferred embodiment of the invention and its operation under on-line software control will now be described by way of illustration only and with respect to the accompanying drawings, in which.

DESCRIPTION OF THE PREFERRED EMBODIMENTS

Figure 1:
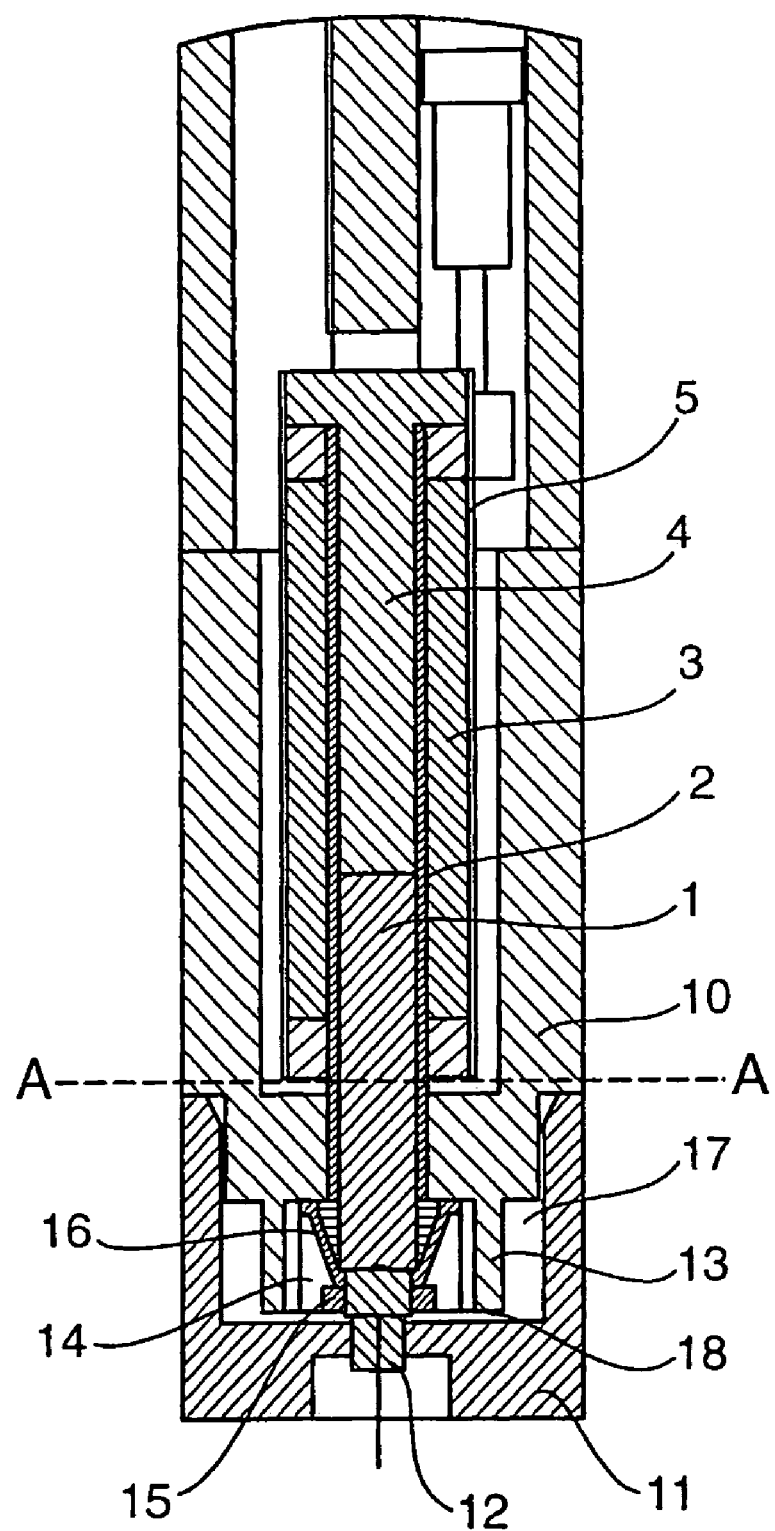
FIG. 1 is a diagrammatic axial cross section through a valve of the invention.
Figure 4:
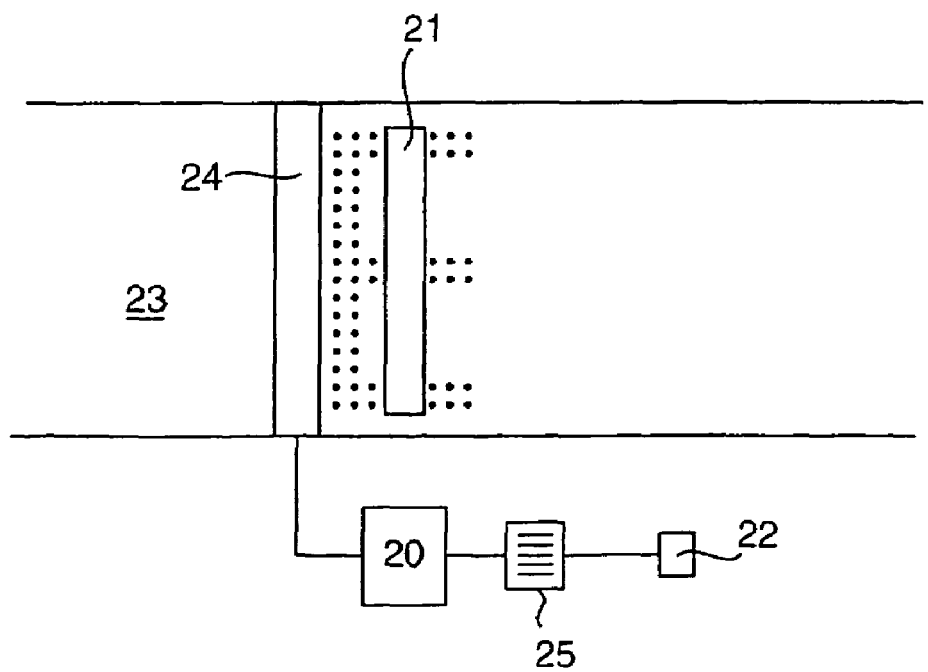
FIG. 4 is a diagrammatic block diagram of an array of FIG. 2 in combination with a CCD camera for monitoring the quality of the printed dots and a computer for establishing what variation to the frequency, form, shape and amplitude of the electrical pulse applied to the coil of the valve of FIG. 1 is required to compensate for any deviation in the quality of the observed printed dot.

The valve of FIG. 1 comprises a plunger 1 which is journalled as a close free sliding fit for axial reciprocation in a stainless steel tube 2. Tube 2 has a thin insulating coating or sleeve (not shown) formed upon its outer face and supports a coil 3 wound upon it. Coil 3 is supplied with an electric current from a source (not shown) under the control of a computer 20, shown in FIG. 4. A stop 4 is mounted at the proximal end of tube 2 to limit the axial retraction of plunger 1 within tube 2. The coil 3 is encased in a metal cylindrical housing 5.

The above assembly is mounted in a support housing 10 which extends axially beyond the distal end of the coil and has a transverse end wall 11 which carries a jewel nozzle 12. In the embodiment shown in FIG. 1, housing 10 has an axially extending internal annular wall 13 which forms the radial wall of the valve head chamber 14 into which the distal end of the plunger extends. The distal end of the plunger 1 carries a terminal rubber or other sealing pad 15 which seats against the proximal end face of jewel 12 in sealing engagement. A pre-tensioned conical spring 16 biases plunger 1 into sealing engagement with the face of the jewel as shown in FIG. 1, the rest or valve closed position.

Plunger 1 is made from a ferromagnetic alloy having a saturation flux density of 1.6 Tesla such a Permenorm 5000 or similar magnetically soft ferromagnetic alloy. In order to reduce the mass of the plunger 1, it may have a blind internal bore extending from the distal end thereof. However, this bore should not extend beyond line A-A shown in FIG. 1 when the plunger is in its rest position. It is also desirable that the plunger have a diameter of less than 3 mms, typically about 1 mm, and a length to diameter ratio of about 5:1. For example, the bore in the jewel nozzle shown in FIG. 1 has an l:d ratio of 2 to 3:1 and the nozzle orifice has a diameter of 60 micrometres.

Ink is fed under a pressure of 1 bar to an ink gallery 17 encompassing wall 13 and enters the valve head chamber via radial ports 18. When the plunger is in its rest position as shown in FIG. 1, the pad 15 is in sealing engagement with the face of the jewel nozzle 12 and thus prevents flow of ink through the nozzle orifice. In order to enhance the seal between the pad 15 and the jewel 12, we prefer to provide the proximal face of the jewel with one or more raised annular sealing ribs (not shown). This has the surprising effect of reducing satellite droplet formation when the valve is operated at high frequencies, typically in excess of 1 to 2 kHz.

Such a valve can be operated at frequencies of from under 1 kHz to over 8 kHz to produce consistently sized droplets in the size range 20 to 150 micrometres or more by controlling the length for which the current flows in the coil 3 and the frequency at which such current pulses are applied to the coil.

Figure 2:
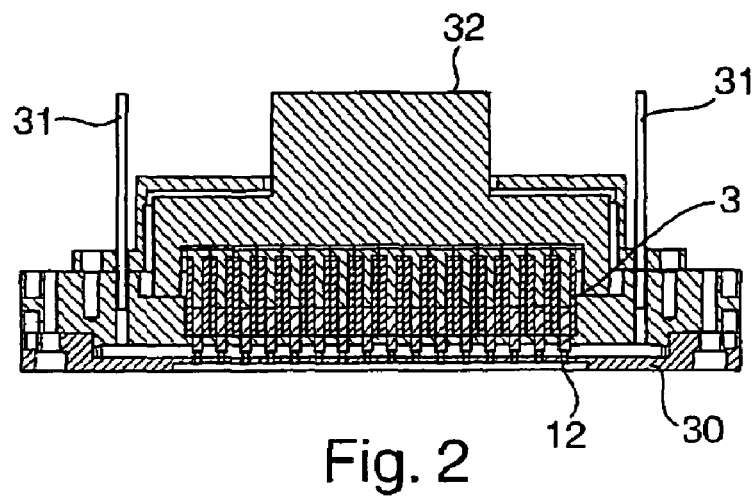
FIG. 2 is an axial cross section through a drop on demand ink jet print head incorporating an array of the valves of FIG. 1.
Figure 3:
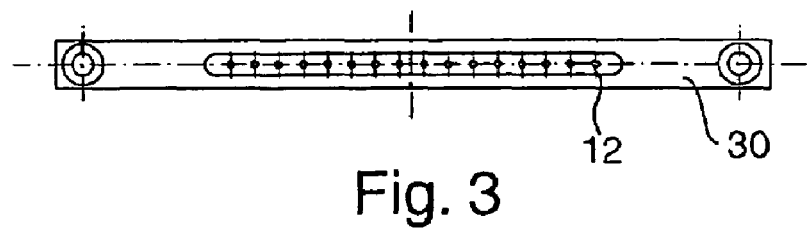
FIG. 3 is plan view of the nozzle plate of the print head of FIG. 2.

As indicated above, the valve is preferably used in an array with other valves to form a print head which extends transversely to the line of travel of a substrate upon which an image is to be printed. Such an array is shown in FIGS. 2 and 3. In this case the terminal portion 11 of the housing 10 is provided by a trough-shaped nozzle plate 30 carrying the nozzles 12 and serving as a manifold to form the ink flow gallery 17 feeding ink from ink inlet spigots 31 at each end of the nozzle plate via the inlet ports 18 to the individual valve head chambers 14 of the valves in the array. The array is provided with a connector 32 by which individual electric current supplies can be fed to the coils 3 in each of the valves. In such an array, the housing 4 serves to reduce electrical and magnetic cross talk between adjacent valves in the array.

Figure 5:
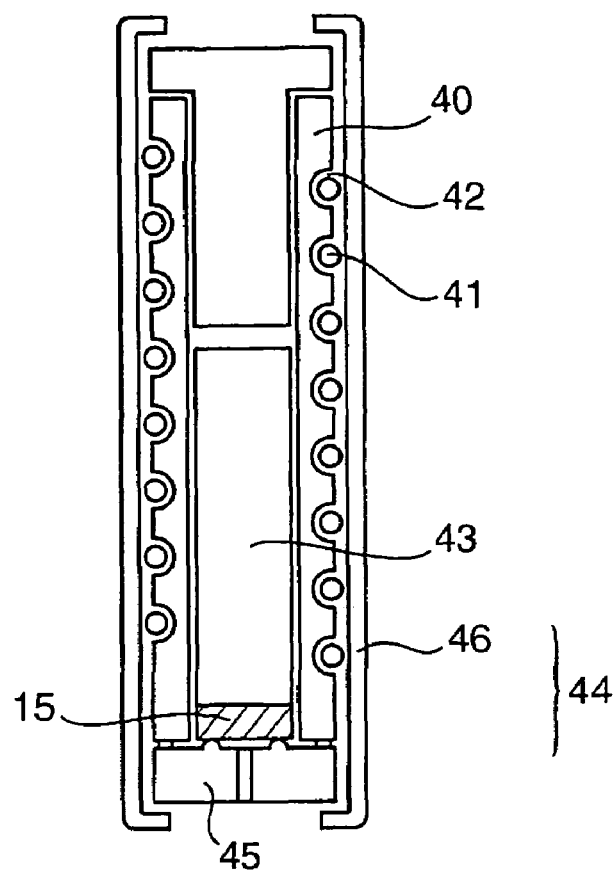
FIGS. 5 to 7 illustrate variations in the construction of the valve of FIG. 1.

Such valves and arrays can be made by machining appropriate metal components. However, one alternative form of construction is to form the tube 2 as a ceramic or silicon member 40 as shown in FIG. 5. The coil 41 can be formed in grooves 42 cut in the external surface of the tube 40 so that the air gap between the coil and the plunger 43 journalled within the tube is reduced. The coil 41 can be a wire coil wound into the grooves 42; or can be a conductive track which is deposited by any suitable means in the grooves 42. If desired, the assembly can then be coated with a polymer to retain and protect the coil within the grooves. In place of a rigid ceramic or silicon support tube, the tube 40 can be provided by a sheet of a flexible support medium, for example a suitable fibre filled polymer or the like, upon which a copper or other conductive track has been formed. The support medium is then rolled into a cylinder to form a cylindrical support carrying the coil upon its inner or outer face. In such designs, the tube 40 can extend axially to form the radial walls 44 of the valve head chamber and the distal open end of the tube closed with a jewel nozzle 45. The whole assembly can then by encased in a stainless steel or other tube 46 which acts to support the assembly and provide the magnetic return path as screening for the coil. The ends of the tube 46 can be inwardly crimped to secure the tube 40, the coil 42 and the jewel 45 in position.

Figure 6:
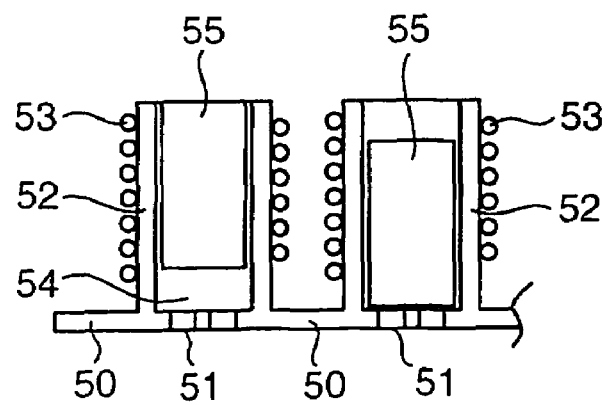

In place of the above forms of construction, an assembly of valves can be formed as shown in FIG. 6 by forming a nozzle plate 50 from a silicon or ceramic frit or other material. This plate is provided with jewel nozzles 51 at the desired spacings along the plate 50. Plate 50 is provided with upstanding tubular members 52 which form the tubes 40 of the valve design of FIG. 5. The coils 53 are wound or otherwise formed upon the upstanding tubular members 52 and the array is completed as in FIG. 5. The valve head chamber 54 is formed by the terminal distal portions of the tubular members and radial ink inlet ports may be provided to enable ink to flow into the valve head chamber. A plunger 55 is journalled in tubular members 52 for axial reciprocation under the influence of coil 53. In place of the jewel nozzle forming the closed distal end to the valve head chamber, the plate 50 can be provided as a continuously extending plate so as to form closed ends to the upstanding tubular members 52. These closed ends can then be pierced, for example by a laser, to form the bores therethrough and the nozzle orifices.

Figure 7:
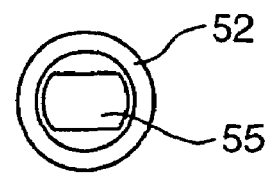

In place of the radial ink inlet ports to the valve head chamber 14 or 54, ink can flow axially past the plunger 1 or 55 from an ink inlet to the axially extending space between the tubular members 2 or 52 and the plungers 1 or 51. To form the axial passages past the plunger, the bore in tubular member 2 or 52 can have an oval or polygonal cross section and plunger 1 or 55 has a circular cross section. However, it is preferred to form plunger 1 or 55 with axial flats to it which provide axial passages between the plunger and the circular cross section bore of the tubular member as shown in FIG. 7.

As indicated above, the operation of the valve is controlled by a computer 20 in response to a CCD camera or array 21 or other sensors 22 detecting the quality of the printed dots and/or other factors such as temperature, voltage, frequency of operation of the valve which also affect the printed dot quality. Thus, the computer 20 determines which valve to open in the array of FIG. 2 and for how long so as to print a drop of the desired size at the desired position on the substrate 23 passing the print head 24. At slow frequencies of operation, for example below 1 kHz, this will usually result in a good quality dot being printed on the substrate. However, as the frequency increases, say to 2 kHz or more, the quality of the printed dot may suffer, for example due to the sudden closure of the valve causing the formation of satellite dots. The computer can respond to this by detecting from the CCD array that such satellite dots are being formed and causing the shape of the pulse of electric current applied to the coil to change so that the movement of the plunger at each extreme of its travel is reduced so as to reduce the sudden-ness of the closure of the valve by causing the plunger to soft land against the face of the jewel nozzle or end wall of the valve head chamber. Alternatively, the computer can respond to the instruction to print at high frequencies by reducing the open time of the valve by reference to a look up table 25 which carries a list of reductions in open time for a range of operating frequencies. Similarly, the software controlling the operation of the print head can detect when a valve has been idle for any length of time and provide, through another look up table, a signal to increase the open time of the valve for the initial dots printed by that valve to compensate for any drying out of the ink within the valve and/or at the nozzle orifice. In such cases, it is preferred that the information between the computer and the look up table be exchanged as bytes sized signals so that up to 256 possible permutations of open time and operating frequency can be accommodated in a single signal.

The printer of FIG. 2 was operated with a nozzle bore having a length to diameter ratio of 10:1, 8:1, 4:1 and 0.5:1 and at a drive current frequency of 2 kHz. At the 10:1 ratio, the pressure required to feed the ink through the bore to achieve a consistent printed dot size was about 10 Bar. However, such a pressure is too high for use with conventional drop on demand print heads and would have resulted in rupture of components. If the pressure was reduced to a more acceptable level, say about 3 Bar, the rate of flow of ink through the print head was insufficient to provide ink to form the droplets consistently so that the printed dots were of uneven size and there were missing dots where the valve had not been able to acquire ink from the reservoir.

Where the ratio was 8:1, the pressure required to feed the ink to the nozzle bore to achieve uniform printed dot size and quality was 5 Bar, which is at the upper extreme of operating capability of the components of a drop on demand printer.

Where the ratio was 4:1, the printer operated successfully at an ink pressure of 1.5 to 2.5 Bar and could print consistent dots at coil drive current frequencies of from less than 1 kHz to 7 kHz.

Where the ratio was 0.5:1, the printer could not be operated, even at ink pressures of 0.1 Bar without causing spraying of the ink and the formation of multiple small dots as well as the desired main dots.

Figure 8:
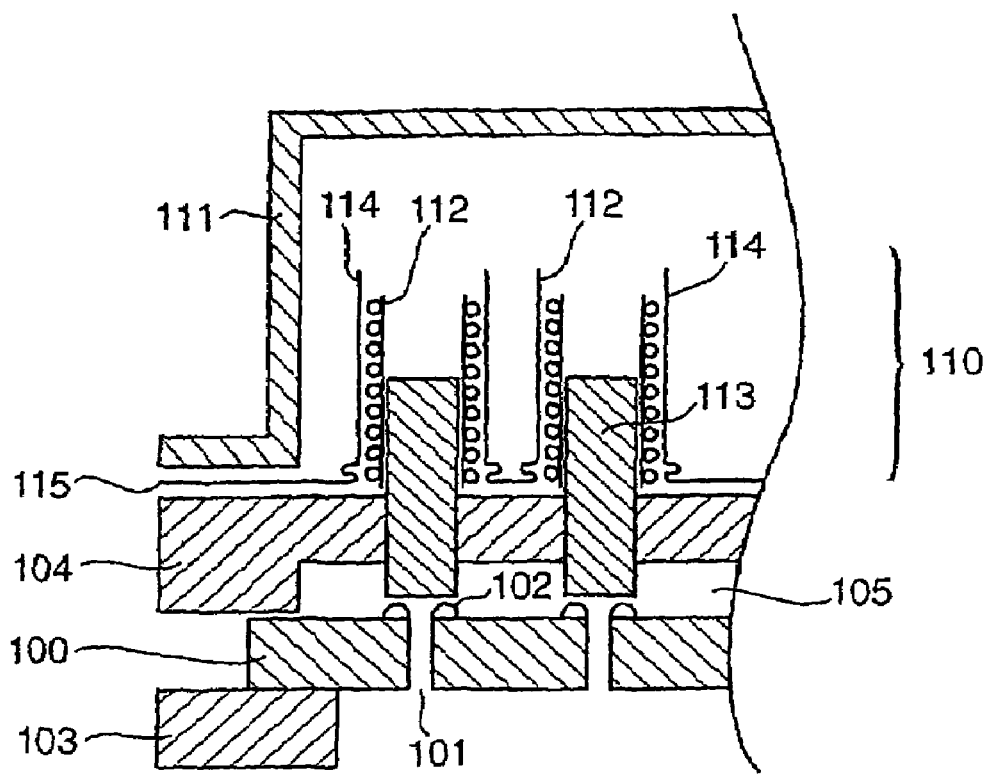
FIG. 8 illustrates an alternative form of the print head of FIG. 2.

The use of a preferred form of drop on demand print head as shown in FIG. 8 in printing images on a carpet pile fabric having a pile length of 3 mms under on-line software control will now be described by way of illustration only.

The printer shown in FIG. 8 is a modification of the print head shown in FIG. 2 in which The nozzle plate 100 is formed with a plurality of bores 101 therethrough having a length of 1000 micrometres and a diameter of 500 micrometres. The plate is made from stainless steel and the bores are formed either by needle punches or by laser drilling each hole. Alternatively, the bores 101 can be formed by electro-etching, which technique can also be used to form the raised annular ridge 102 around the inlet to each of the bores 101. This foil nozzle plate is clamped between two stainless steel support plates 103 and 104. Plate 104 is formed with a single manifold chamber 105 which extends over all the bores 101 formed in plate 100. Alternatively, the chamber 105 can be formed in plate 100.

A valve assembly 110 contained in a support housing 111 is secured to plates 100, 103 and 104 with each of the plungers in a valve mechanism within the assembly in register with a bore 101. The valve mechanisms comprise a coil wound upon a support tube 112 within which a plunger 113 is a loose sliding fit. Each coil is surrounded by a stainless steel housing 114 which is crimped to an apertured support plate 115 clamped between housing 111 and plate 104 to locate and secure each valve mechanism with the plunger projecting through the aperture in register with a bore 101 in the nozzle plate 100. The electrical contacts for the coils are fed from a multi-contact plug and socket from a computer controlled power source, not shown. The valve head chamber for each valve mechanism 110 is provided by the single manifold chamber 105 which is fed with ink from each end of plate 104.

The plungers 113 are made from a ferromagnetic alloy having a saturation flux density of 1.6 Tesla, a coercivity of 0.2 a/m and a relative magnetic permeability of 100,000. The alloy is a 45/55 Ni/Fe alloy sold under the trade mark Permenorm 5000 and each plunger is 2 mm in diameter and 7.5 mms long. The nozzle bore and orifice in the jewel nozzle have a diameter of 300 micrometres and an l:d ratio of from 2:1 to 3:1.

Ink having a viscosity of 250 cPs is fed under a pressure of 1.5 bar to the manifold chamber 105 and enters the bore 101 when the plunger 113 is retracted by applying current to coil 112.

Such a valve can be operated at frequencies of from under 1 kHz to over 8 kHz to produce consistently sized droplets in the size range 250 to 500 micrometres by controlling the length for which the current flows in the coil 112 and the frequency at which such current pulses are applied to the coil.

The print head of FIG. 8 was used to apply inks having a viscosity of 300 cPs through a nozzle orifice of 500 micrometres to apply different coloured inks to the pile of a neutral wool fibre coloured tufted carpet. The print head was operated at a frequency of 2 kHz to achieve substantially uniform coloration of the individual fibres within the pile. The boundaries between different colours of the printed image were clearly defined and the definition of the image was excellent. In an alternative operation, the pint head was programmed not print an ink dot at the boundary between two colours so as to minimise the risk of colour bleeding between areas of different colours.

The calibration of a solenoid valve using software will now be described with respect to FIGS. 9 to 13.

Figure 9:
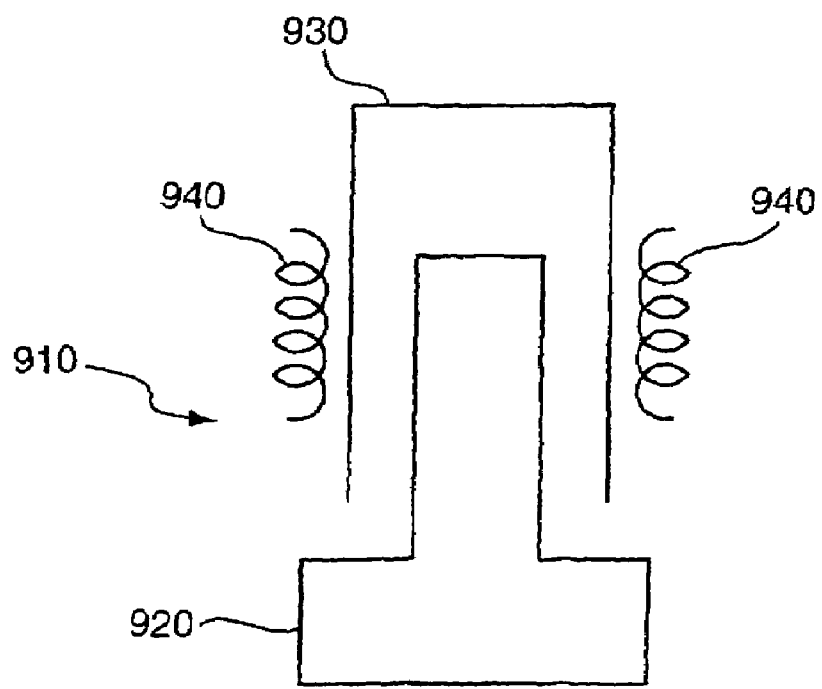
FIG. 9 shows a schematic depiction of a solenoid valve which is suitable for use with the calibration of the valve using software according to that aspect of the present invention.

FIG. 9 shows a schematic depiction of a solenoid valve 10 which is suitable for use with the method of the present invention. The valve 910 comprises plunger 920, tube 930 and coils 940. The plunger 920 comprises a ferromagnetic material (or any other magnetic material) and is received within the tube 930 so as to be able to move freely along the axis of the tube. The plunger can be impelled, for example towards the open end of the tube, by the application of a current to the coils 940, the current generating a magnetic field within the tube, which causes a magneto motive force to act upon the plunger. The timing and frequency of the current pulses applied to the coils can be controlled by computer (not shown). The solenoid valve additionally comprises a return mechanism (not shown), such as a spring, that acts to return the plunger to its initial position once the plunger has completed its full range of travel.

Figure 10:
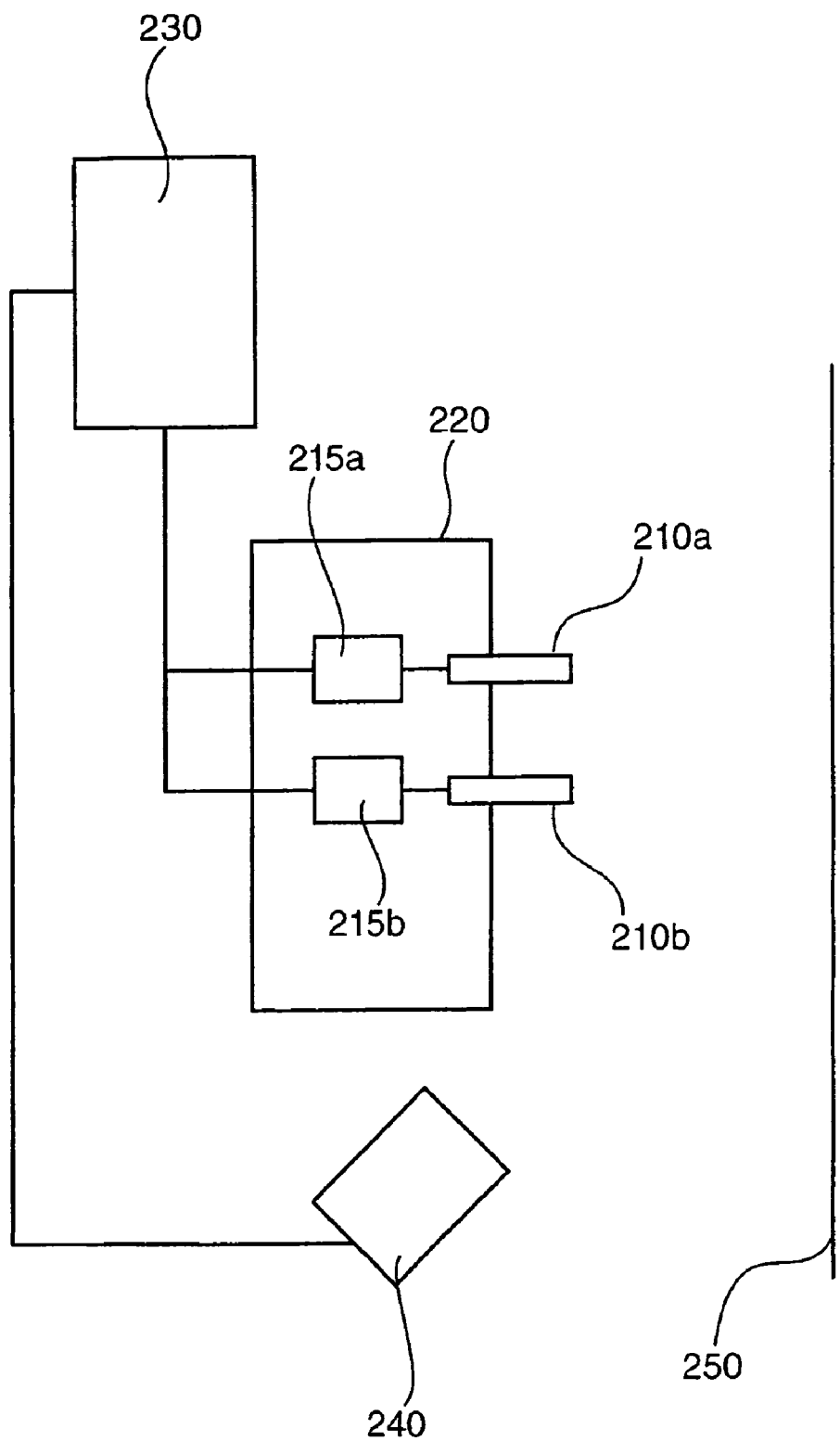
FIG. 10 shows in diagrammatic form an apparatus for use in this aspect of the invention.

In practice, a print head will comprise a matrix of such valves that are arranged in a square or rectangular arrangement. FIG. 10 shows two exemplary valves 210a, 210b from such a print head matrix 220. Associated with each valve is valve control means 215a, 215b, each of the valve control means being in communication with a central computer system 230. The operation of each valve is controlled by the transmission of control pulses from the central computer system 230 to each of the valve control means 215a, 215b. The valve control means are responsive to the central computer system such that the central computer system is able to vary the time that the valves are held open for. This controlled variation of the valve enables ink drops of a desired size to be produced for depositing upon the substrate 250.

The print head can be calibrated upon manufacture and then at periodic intervals during its operation. The central computer system instructs the print head to generate a predetermined matrix of drops. This test matrix is deposited on a test substrate and the printed image can be examined to determine the correlation of the printed image to the original test matrix. If the ratio of the size of a printed pixel to the size of the respective pixel of the original test matrix is outside a threshold value then the respective valve control means can be instructed to change the time that the valve is to be opened for. If the printed pixel is too small then the valve open time will be increased (either by the addition of more time or by multiplying the valve open time by a suitable constant). Similarly, if the printed pixel is too large, then the valve open time will be decreased accordingly. The threshold that is used to determine whether a printed pixel is too small or too large may be varied in accordance with the nature of the print substrate and/or the application that the print head is being used for.

As variations in printed pixel size will depend upon mechanical variations within the valve, it is possible that a valve may operate satisfactorily for one size of pixel or within a given range of valve operating rates. Therefore, the calibration may need to be repeated across the range of pixel sizes and valve rates that will be used by the valve. The range of calibration factors that are required by each valve may be stored in a look-up table, or it may be possible to determine one or more equations such that the relevant calibration factor can be calculated given the desired valve operation rate and pixel size.

In an alternative embodiment, imaging means 240 may be additionally coupled to the computer control system and aligned so as to view the area of the substrate that the print head matrix prints upon. When a test matrix is printed upon the substrate, the image means is able to convert that image to an electrical signal that can be transmitted to the central computer system. The central computer system can, after any necessary image processing (digitising, filtering, etc.), compare the printed image with the original test matrix that is stored within the central computer system. The ratio of pixel sizes can be determined for each pixel and calibration factors calculated for each valve as required. The central computer system can then communicate the calibration factors to the valve control means associated with the valves that require calibration.

The valve control means receives, interprets and executes signals that are received from the central computer system. It will be readily understood that the valve control means may be implemented such that each valve has a dedicated control means or alternatively that a number of valves may be controlled by a single control means.

In a preferred embodiment, the valve control means comprise a field programmable gate array (FPGA). FPGAs comprise memory and logic elements that can be configured by the user to provide a desired functionality.

Figure 11:
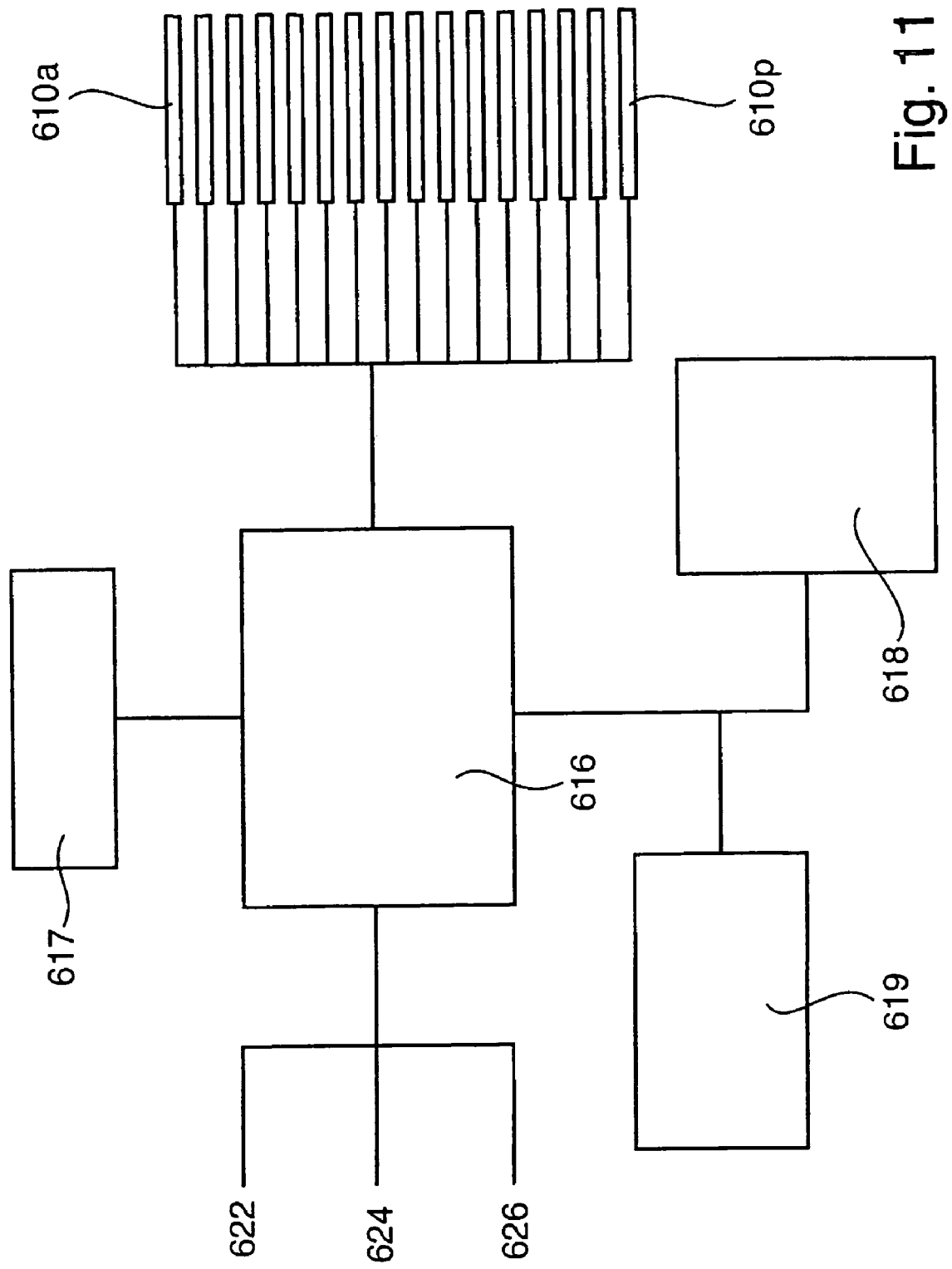
FIGS. 11 to 13 illustrate alternative forms of the apparatus of FIG. 10.

In the preferred embodiment, the FPGA, and associated devices, is used to control a linear array of 16 valves. Referring to FIG. 11, the valves 610a, 610b, . . . , 610p are controlled by valve control means that comprise FPGA 616, electrically erasable programmable ROM (EEPROM) 617, RAM 618, programmable ROM (PROM) 619 and input/outputs 622, 624, 626. The FPGA 616 is connected to each of the valves 610a, 610b, . . . , 610p, EEPROM 617, RAM 618 & PROM 619. All three input/outputs 622, 624, 626 interface with the FPGA. When the FPGA is powered up, it loads its internal configuration data from PROM 619 and then follows the sequences that have been loaded from the PROM. The EEPROM 617 stores a range of data comprising a look-up table comprising data associated with each of the valves, data specific to the valve control means and FPGA, status information, etc. The FPGA will load this data from the EEPROM and then initialise the RAM 618, by writing zero values into each memory location in RAM. The FPGA will then wait to receive print data or other commands from one of the inputs. Input/output 622 is connected to the computer control system and input/output 624 can be used to connect to a further valve control means (see below). Input 626 provides a series of pulses that are used in co-ordinating the printing process. When the array of valves is printing onto a substrate, the substrate is normally moved underneath the valves. The series of pulses supplied to input 626 may be generated from an encoder applied to a shaft in the apparatus that is moving the substrate relative to the valves.

Figure 12:
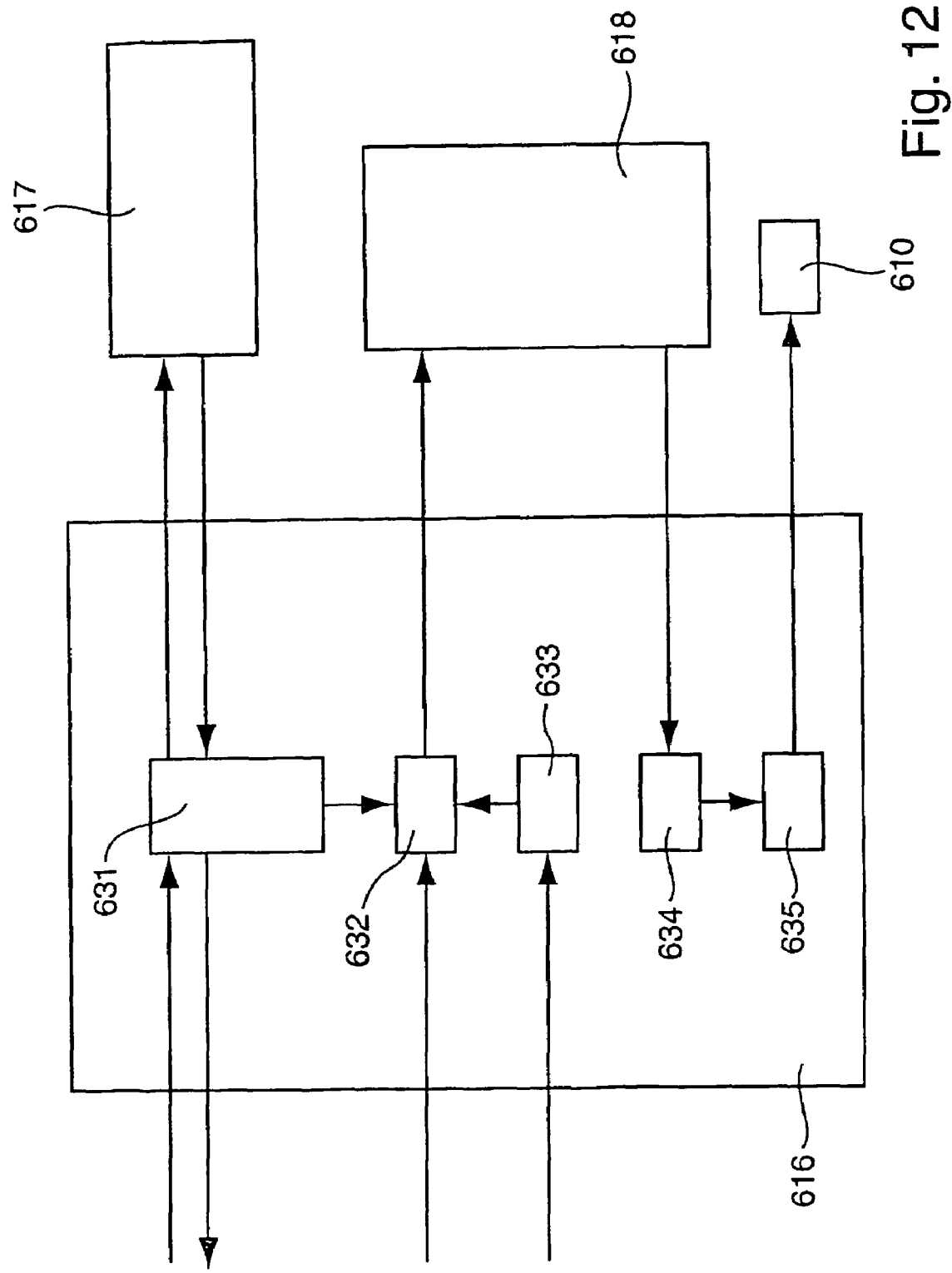
Figure 13:
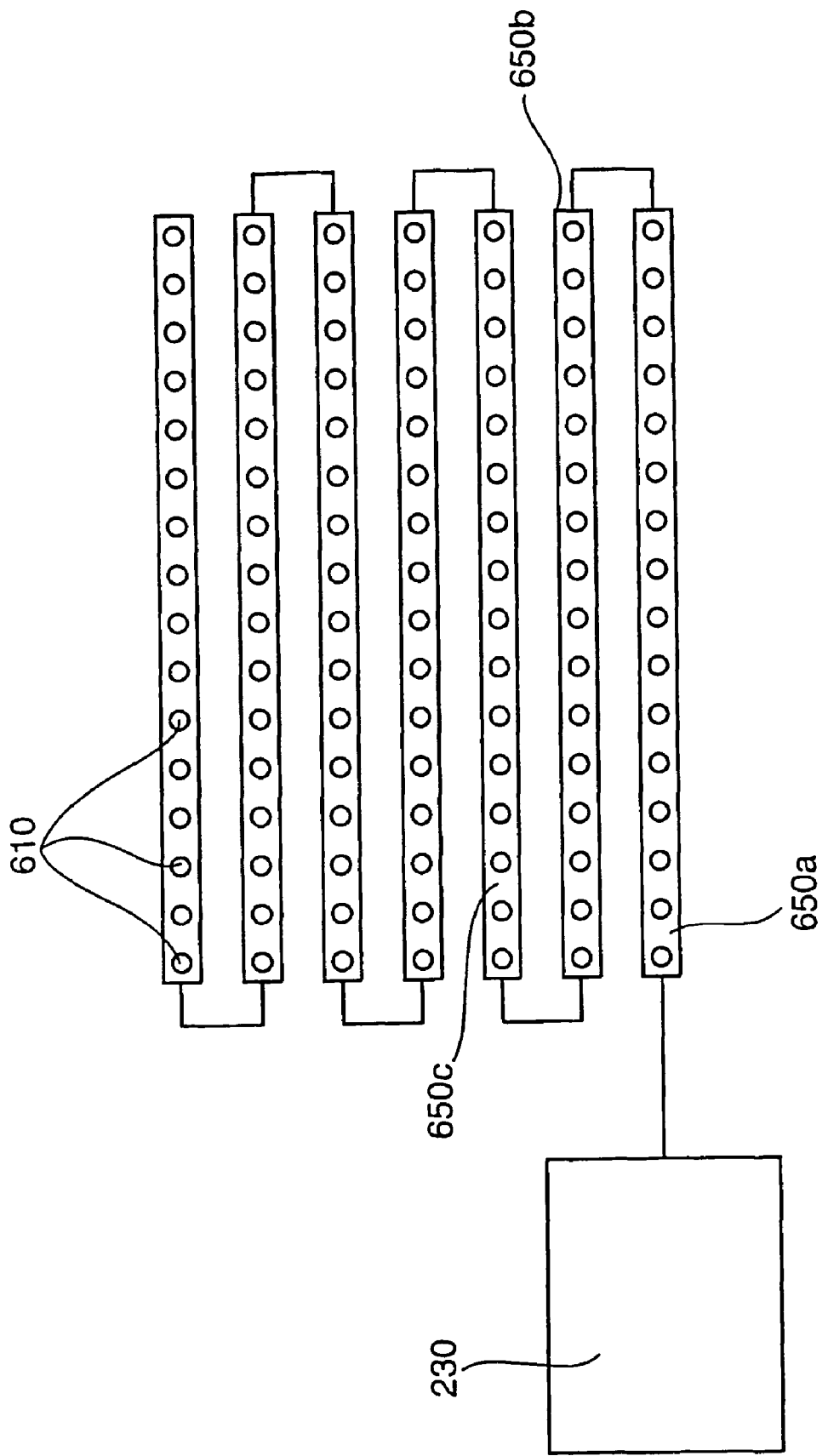

FIG. 12 shows a schematic depiction of a number of registers that are formed with the FPGA when the FPGA configuration data is loaded from PROM 619. The first register 631 is used to write to and read from the EEPROM 617 and is also used when initialisation data is read from the EEPROM. Second register 632 receives print data from the computer control system, such as the alphanumeric characters or bitmaps to be printed, or a signal to initiate a printing process. Second register 632 also writes print data to the RAM and is used to initialise the RAM during the start-up phase. The third register receives configuration data from the computer control system such as data controlling the slant that may be applied to the print head. Fourth register 634 receives print data from the RAM and passes it to the fifth register 635, which uses the print data to operate the valves 610.

A desired print image (which may include alphanumerical characters) is entered into the computer control system and this image is then converted into raster data that is to be communicated with the valve control means. The valves 610 may be operated for different periods of time so as to provide the appearance of 16-level greyscale images. Thus the print data can be supplied in the form of a raster comprising a 4 bit word for each valve, with the value of the 4-bit word determining the greyscale that is to be generated by the valves. The print data is received by the second register and written into the RAM 618. The RAM is logically arranged in 16 rows, with each of the valves corresponding to a row. There are a plurality of columns, each of which corresponds to a time slot. Each raster scan also corresponds to a time slot and the time slot is determined by the frequency at which the shaft encoder supplies pulses to the FPGA.

When print data is received at the FPGA the second register interprets the greyscale data for each valve, obtaining the time that each valve must be opened for in order to generate the desired greyscale from a look-up table held in the first register. In theory, each valve should be held open for the same period of time in order to generate the dame greyscale, but mechanical variations in each valve will lead to each valve having slightly different characteristics. Calibration factors that account for these differences are held in the look-up table. The valve times are then written into the RAM, using as many columns as are necessary to store all of the rasters. A write pointer is set to the first column of the data. Each memory location holds the grey scale value for the associated valve and time slot.

When the next shaft encoder pulse is received the RAM column indicated by the write pointer is read to see which of the 16 valves need to be operated, i.e. which memory locations have non-zero entries. Once the memory locations have been read then all the memory locations in the column are overwritten with zero.

The identity of these valves, along with the time for which the valves are to be held open are then transmitted to the fourth register, which may perform further operations on the valve times in order to correct for valve operation at high speed or a long time period between subsequent operations of the valve. The valve times are then passed to the fifth register which calculates the number of shaft encoder pulses that are equivalent to the valve times. The valves are then opened for a period of time equal to that number of shaft encoder pulses.

As the valves 610 are electromechanical devices, their size provides a limitation to the print resolution that can be obtained. Typically, each valve may be provided at an offset of 4 mm from the adjacent valve(s). If a greater resolution (i.e. smaller pixel separation is required) then the matrix may be slanted so that the valves are closer together in one axis. The disadvantage of this is that if no correction is made to the print rasters then the desired image will be printed out slanted.

Such a correction may advantageously be provided using the RAM to provide a slant to the print raster data. Once the greyscale data has been translated into valve open times, rather than writing the valve data into a vertical column, the write data can be offset across a number of columns. For example, if the desired slant angle is 45° then the valve open time for the first valve should be written into the column indicated by the write pointer, the valve open time for the second valve should be written into the next column along from the column indicated by the write pointer, and so on, such that the valve open time is written into the RAM at the desired slant angle.

Typically the 16-level greyscale can be provided using valve open times between approximately 80 .mu.s and 250 .mu.s. It has been found advantageous to initially open the valve by providing a first voltage for a first period of time and to provide a second voltage, that is lower than the first voltage, for a further period of time in order to hold the valve open. This reduces the possibility that the valve remains open for longer than is required to provide the desired greyscale, leading to decreased printing performance. It has been found particularly advantageous to apply a 36V pulse for approximately 80 .mu.s and a second pulse of approximately 5V for the remainder of the time that the valve remains open.

In a further preferred embodiment, the valve control means and valves described above with reference to FIG. 11 will be co-located upon a single circuit board 650. A number of circuit boards can then be connected in serial and physically located in a vertical array so that the valves can deposit a two-dimensional matrix on a print substrate. In such a case (see FIG. 14), one of the boards 650a will be connected via serial input/output 622 to the computer control system 230 and to the second board via serial input/output 624. The second board 650b will be connected to the first board via serial input/output 622 and to the third board 650c via serial input/output 624, and so on. The last board in the serial chain can detect its position as its serial input/output 624 will have no connection. On power up the last board in the serial chain assigns itself address 0 and transmits this address to the preceding board, which then assigns itself address 1. This process continues, with the address value being incremented until each board has an assigned address. The first board 650a will then report its address to the computer control system such that the system is aware of the number of connected boards. The system will prefix any communication with a board with the board's address. Preferably 16 boards are connected together to provide a 16.times.16 printing matrix.

The FPGA used in the preferred embodiment was a Xilinx Spartan II XC2S100 which was preferred as its configuration was determined by the data loaded from the PROM in start up. Such an FPGA may be replaced by a cheaper device in which the FPGA is hardwired, for example by blowing fuses to form logic elements, rather than configurable through software.

It will be understood that the above technique for calibrating a solenoid valve is suitable for use with any type of solenoid valve and in any application in which solenoid valves are used. However, the technique is of especial application to the compact high speed valves of the invention where the small size of the components makes manual adjustment of the position of pole pieces and other components difficult and inaccurate.

As stated above, the software and computer control can be used to decelerate the movement of the plunger at either or both extremes of its travel so as to reduce spattering of the ink from the nozzle orifice due to excessive slamming of the plunger against its seat.

According to another aspect of the present invention there is provided a method of operating a solenoid valve, the method comprising the step of energising an electric coil to generate a magnetic field in order to reciprocally drive a plunger within a coil, wherein the magnetic field is controlled such that the speed of the plunger is decreased as the plunger approaches at least one of its extremes of movement. The control of the magnetic field may be achieved in a number of ways.

In a preferred embodiment, the magnetic field may be controlled such that the speed of the plunger is decreased as the plunger approaches its closed position, in order to reduce the impact as the valve closes. The magnetic field may be controlled such that the speed of the plunger is decreased, the magnetic field resisting a force exerted on the plunger by a return means. Such a method of operating the valve is now described with reference to FIGS. 14 to 16.

Figure 14:
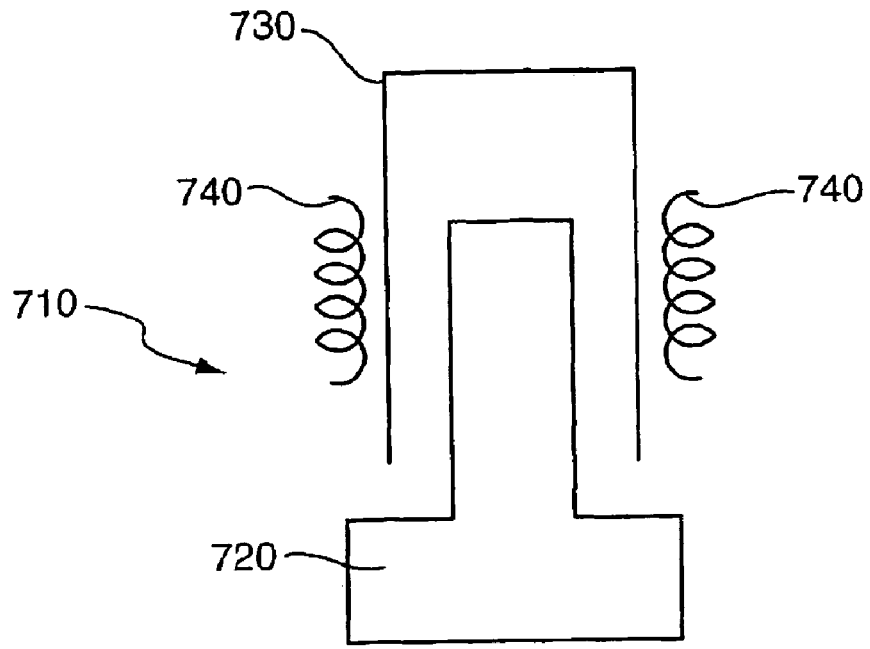
FIGS. 14 and 15 show diagrammatically a valve and printer in which the current applied to the coil is modified to decelerate the plunger at either extreme of its travel.

FIG. 14 shows a schematic depiction of a solenoid valve 710 which is suitable for use with this method of operating the valve. The valve 710 comprises plunger 720, tube 730 and coils 740. The plunger 720 comprises a ferromagnetic material (or any other magnetic material) and is received within the tube 730 so as to be able to move freely along the axis of the tube. The plunger can be impelled, for example towards the open end of the tube, by the application of a current to the coils 740, the current generating a magnetic field within the tube, which causes a magneto motive force to act upon the plunger. The timing and frequency of the current pulses applied to the coils can be controlled by computer (not shown). The solenoid valve additionally comprises a return mechanism (not shown), such as a spring, that acts to return the plunger to its initial position once the plunger has completed its full range of travel.

Conventionally, current is supplied to energise the coils as a simple square wave (or as a triangular wave having a steep gradient) in order to provide a rapid acceleration of the plunger towards the closed end of the tube. Similarly, once the plunger has reached its maximum travel within the tube, the current is reduced quickly in order to reduce the magnetic force acting on the plunger quickly. This is advantageous as any magnetic force will oppose the force exerted upon the plunger by the return mechanism and thus the greater the magnetic force, the slower the return time of the plunger.

However, it has been established that in some high-speed applications for solenoid valves, such as their use within ink jet printers, and notably within 'drop on demand' ink jet printers, the increased rate at which magnetic forces are applied to and removed from the plunger are having a deleterious effect upon the operation of the valve.

Figure 15:
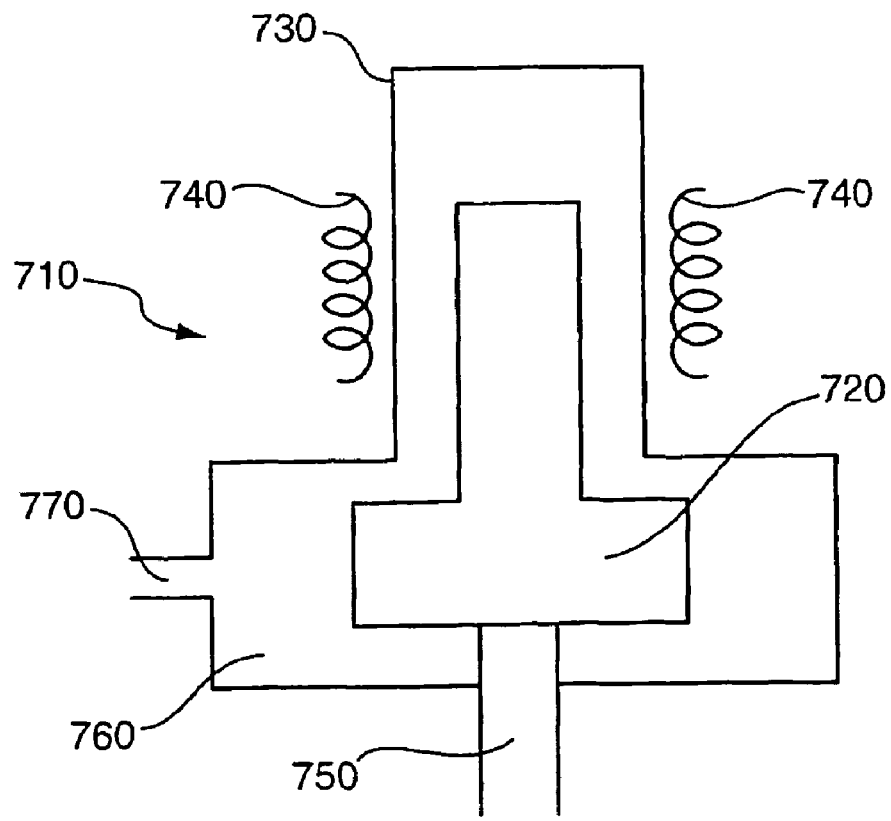

FIG. 15 shows a schematic depiction of a solenoid valve 710 which is used within a drop on demand inkjet printer. The plunger 720 is, in its closed position, received upon an end of a nozzle bore 750 so as to seal the nozzle. The tube 730 extends out at its open end to form a chamber 760 which comprises an inlet 770 through which ink can be supplied. Energising the coils 740 through the application of an electrical current to the coils impels the plunger along the tube, towards the closed end of the tube. The movement of the plunger unseals the end of the nozzle bore, allowing ink to flow through the nozzle orifice. Once the magneto motive force (MMF) is removed from the plunger (through the removal of the current from the coils 740) the return mechanism (not shown) returns the plunger to its closed position such that the plunger acts to seal the nozzle bore. Some form of seal or baffle may be applied to the nozzle bore and/or the end face of the plunger in order to enhance the seal between the plunger and the nozzle bore so as to reduce the probability of ink entering the nozzle bore when the plunger is in its rest position.

It is desirable for the return mechanism to return the plunger to its closed position quickly to avoid the nozzle being left open for too long: thus it is important to turn off the current pulse to the coils 740 as soon as possible. The reciprocating motion of the plunger within the tube and the chamber is controlled so that a precisely controlled drop of ink will be ejected from the nozzle orifice to be deposited upon a substrate (not shown). When the valve is operated at high frequencies, typically from 2 to 4 kHz. Operation at such high speeds can cause problems due to the method by which the coils are energised.

The energising of the coils causes the plunger to undergo a rapid acceleration until its motion is impeded by the end of the tube. Only the damping effect of the fluid within the tube and the force exerted by the return mechanism opposes the motion of the plunger caused by the energising of the coils.

The abrupt nature of the plunger's motion causes the formation of satellite droplets around the intended drops that are printed on the substrate. It is believed that the rapid acceleration of the plunger as it moves away from its rest position is responsible for the formation of these satellite droplets and that the problem is exacerbated due to the limited fluid damping provided by the fluid within the tube. Furthermore it has been observed that, if the force exerted upon the plunger by the return means is too great and if the magnetic force applied to the plunger is minimal as the plunger returns to its rest position, then the impact of the plunger on the inlet to the nozzle bore can cause damage to the structure of the plunger or the nozzle (or to any sealing means provide on the nozzle or the plunger).

The possibility of producing such satellite droplets can be reduced by altering the method by which the plunger is impelled. Rather than using a square (or triangular) current pulse to energise the coils as described above, the current is applied to the coils in a more gradual fashion. Similarly, if the manner in which the coils are de-energised is controlled appropriately, then the deceleration of the plunger will be less abrupt, which should serve to further reduce problems which are caused by the impact of the plunger on the nozzle bore inlet. It is believed that similar problems may occur when solenoid valves are operated at very high speeds in applications other than ink jet printing.

The current may be applied as a generally triangular pulse (which may or may not be symmetrical in the time domain), as a generally Gaussian pulse, a generally sinusoidal pulse or some other form of non-square pulse that reduces the initial acceleration and final deceleration of the plunger. The exact nature of the solenoid valve and the rate at which it is being opened will determine whether or not the abrupt acceleration and deceleration of the plunger has a deleterious effect upon the operation of the solenoid valve.

Figure 16A:
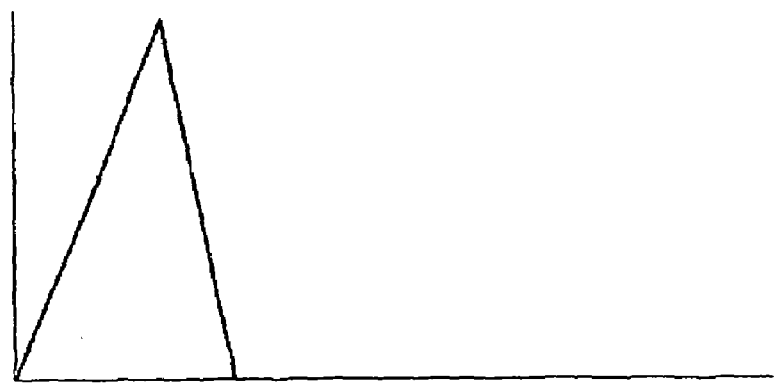
FIG. 16 illustrates the form of current pulse applied.
Figure 16B:
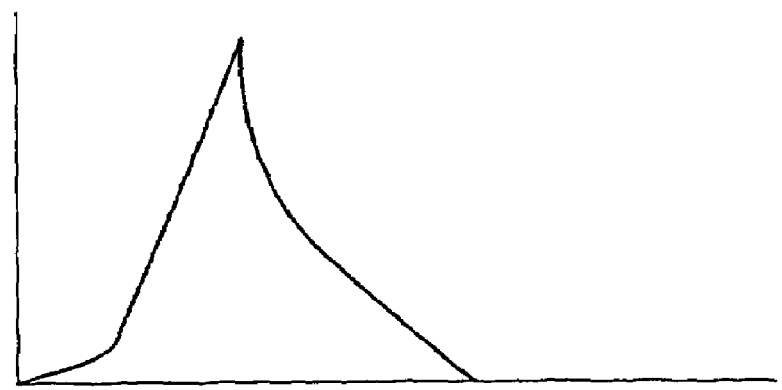

FIG. 16a shows a graphical indication of a typical triangular wave that is conventionally used to energise the coils. FIG. 16b shows a graphical indication of a triangular wave that is used according to the method of the present invention to energise the coils. It can be seen that in the first part of the waveform shown in FIG. 16b the gradient of the wave is less than for the waveform of FIG. 16a. This ensures that the plunger is accelerated away from its rest position at a slower initial rate, reducing the possibility of forming satellite droplets. It will also be noticed that in the latter part of the waveform there is a greater current so that the magnetic force exerted upon the plunger acts to damp the motion of the plunger, moderating the effect of the return mechanism. It will be understood that the exact waveform will be dependent upon, amongst other factors, the nature and structure of the solenoid valve, the speed at which it is operated, the application in which it is used, etc., and that the waveform shown in FIG. 16b is purely exemplary.

Figure 16C:
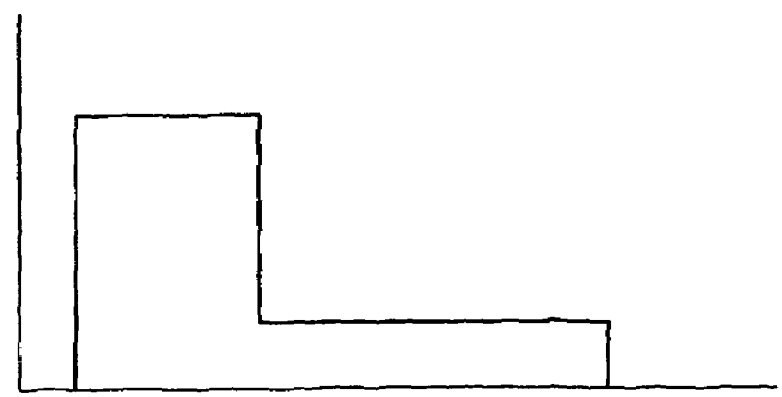

Experimentation can be used to determine a suitable, or optimum, waveform or set of waveforms for use with a particular application. One waveform that was found to be of advantage is shown in FIG. 16c. It has been found advantageous to initially open the valve by providing a first voltage for a first period of time and to provide a second voltage, that is lower than the first voltage, for a further period of time in order to hold the valve open. This reduces the possibility that the valve remains open for longer than is required to provide the desired greyscale, leading to decreased printing performance. It has been found particularly advantageous to apply a 36V pulse for approximately 80 .mu.s and a second pulse of approximately 5V for the remainder of the time that the valve remains open.

During the high speed operation of solenoid valves in ink jet printing, the ink drops being deposited on a substrate can be monitored using a CCD (charge coupled device) camera coupled to a computer control system to determine the number of problem satellite droplets that are being formed and the frequency with which they are being formed. The collected data can be analysed by the computer, which can vary the current pulses accordingly to reduce the number of satellite droplets being formed. The computer may select a current pulse from a range of pulses stored in memory, along with an indication of the likelihood of a given current pulse reducing the formation of satellite droplets.

In a preferred embodiment, the valve control means comprise a field programmable gate array (FPGA) using the circuitry shown in FIG. 12. FPGAs comprise memory and logic elements that can be configured by the user to provide a desired functionality.

The invention claimed is:

1. A method for applying an image forming composition to a pile fabric using a drop on demand ink jet printer, comprising the steps of: a. providing a drop on demand ink jet printer, comprising: 1. a reservoir; 2. a nozzle orifice; and 3. a valve for regulating the flow of ink from the reservoir to the nozzle orifice, the valve comprising: i. a plunger member journalled for axial reciprocation between a rest and an operative position within a tubular member supporting an electric coil under the influence of a magnetic field generated by that coil when an electric current passes through the coil; ii. bias means to bias the plunger towards its rest position when no current is applied to the coil, the distal end of the plunger extending into a valve head chamber having a outlet bore to a nozzle orifice, the reciprocation of the plunger being adapted to open or close a fluid flow path from the valve head chamber through that bore to the nozzle orifice; and wherein, the plunger is made from an electromagnetic material having a saturation flux density from 1.2 to 1.8 Tesla, the bore leading from the valve head chamber to the nozzle orifice has a length to diameter ratio of 5:1 or less, and the nozzle orifice has a diameter of 80 micrometers or less; and b. operating the printer at a drop generation frequency of at least 1 kHz.

2. A method for printing an image on a pile fabric, using a drop on demand printer in which the solenoid valve mechanism for controlling the flow of fluid to the nozzle orifice comprises a plunger member journalled for axial reciprocation between a rest and an operative position within an electric coil under the influence of a magnetic field generated by that coil when an electric current passes through the coil, the distal end of the plunger extending into a valve head chamber having an outlet nozzle bore, the reciprocation of the plunger being adapted to open or close a fluid flow path from the valve head chamber through that bore, characterized in that: a. the plunger is of a unitary construction and is made from an electromagnetically soft material having a saturation flux density from 1.4 to 1.8 Tesla, a coercivity of less than 0.25 ampere per meter, and a relative magnetic permeability in excess of 10,000; and b. the nozzle bore leading from the valve head chamber to the nozzle orifice has a length to diameter ratio of less than 8:1.

* * * * *